| (12) | United States Patent | (10) Patent No.: | US 8,892,455 B2 |
|---|---|---|---|
| | Lerner et al. | (45) Date of Patent: | *Nov. 18, 2014 |

(54) SYSTEMS, TECHNIQUES, AND METHODS FOR PROVIDING LOCATION ASSESSMENTS

(75) Inventors: Matthew R. Lerner, Seattle, WA (US); Jesse G. Kocher, Seattle, WA (US); Michael C. Mathieu, Seattle, WA (US)

(73) Assignee: Walk Score Management, LLC, Seattle, WA (US)

(*) Notice: Subject to any disclaimer, the term of this patent is extended or adjusted under 35 U.S.C. 154(b) by 1014 days.

This patent is subject to a terminal disclaimer.

(21) Appl. No.: 12/151,726

(22) Filed: May 7, 2008

(65) Prior Publication Data

US 2009/0088967 A1    Apr. 2, 2009

Related U.S. Application Data

(60) Provisional application No. 60/995,823, filed on Sep. 28, 2007.

(51) Int. Cl.
| *G06Q 10/00* | (2012.01) |
| *G05D 1/00* | (2006.01) |
| *G06Q 10/04* | (2012.01) |
| *G01C 21/32* | (2006.01) |
| *G06Q 30/02* | (2012.01) |
| *G01C 21/20* | (2006.01) |
| *G01C 21/34* | (2006.01) |
| *G01C 21/36* | (2006.01) |
| *G06F 17/18* | (2006.01) |

(52) U.S. Cl.
CPC .............. *G06Q 10/047* (2013.01); *G01C 21/32* (2013.01); *G06Q 30/0205* (2013.01); *G01C 21/20* (2013.01); *G01C 21/3476* (2013.01); *G01C 21/3679* (2013.01); *G06F 17/18* (2013.01); *G06Q 30/0206* (2013.01)
USPC .............................. 705/7.34; 705/7.11; 701/1

(58) Field of Classification Search
CPC ............................ G06Q 30/0205; G01C 21/32
USPC ................. 700/200, 201, 202, 203; 340/989, 340/995.1, 995.23, 995.24
See application file for complete search history.

(56) References Cited

U.S. PATENT DOCUMENTS

| 5,500,793 A | 3/1996 | Deming, Jr. et al. |
| 6,141,648 A | 10/2000 | Bonissone et al. |

(Continued)

OTHER PUBLICATIONS

TDM Encyclopedia. Evaluating Nonmotorized Transport. www.vtpi.org/tdm/tdm63.htm. Updated Apr. 4, 2006.*

(Continued)

*Primary Examiner* — John Q Nguyen
*Assistant Examiner* — Jordan S Fei
(74) *Attorney, Agent, or Firm* — Perkins Coie LLP

(57) ABSTRACT

Methods and systems for providing location assessments are provided. Example embodiments provide a Location Assessment Provider System, which generates and provides assessments of various characteristics of specified locations. In one embodiment, the Location Assessment Provider System receives a specified location, determines a location assessment for the specified location, generates a visual representation of the determined location assessment, and provides the generated visual representation to a client system. Determining a location assessment may be based on geographic-related information about, or associated with, the specified location, such as the presence and location of geographic-related features associated with the specified location. This abstract is provided to comply with rules requiring an abstract, and it is submitted with the intention that it will not be used to interpret or limit the scope or meaning of the claims.

35 Claims, 17 Drawing Sheets

(56) References Cited

U.S. PATENT DOCUMENTS

| | | | |
|---|---|---|---|
| H1997 H | 10/2001 | Fleischer | |
| 6,542,748 B2 | 4/2003 | Hendrey et al. | |
| 6,708,174 B1 | 3/2004 | Tenorio | |
| 7,251,589 B1 | 7/2007 | Crowe et al. | |
| 7,890,403 B1 | 2/2011 | Smith et al. | |
| 2002/0035535 A1* | 3/2002 | Brock, Sr. | 705/37 |
| 2002/0178179 A1 | 11/2002 | Rosenblum et al. | |
| 2003/0182052 A1* | 9/2003 | DeLorme et al. | 701/201 |
| 2006/0190378 A1 | 8/2006 | Szydlo | |
| 2006/0247956 A1 | 11/2006 | Rosen et al. | |
| 2006/0287810 A1* | 12/2006 | Sadri et al. | 701/200 |
| 2007/0156512 A1 | 7/2007 | Yerkie | |
| 2007/0179823 A1 | 8/2007 | Bhaskaran et al. | |
| 2008/0312942 A1* | 12/2008 | Katta et al. | 705/1 |
| 2009/0048981 A1 | 2/2009 | McBain Millan | |
| 2009/0063252 A1 | 3/2009 | Abhyanker | |
| 2009/0089149 A1 | 4/2009 | Lerner et al. | |

OTHER PUBLICATIONS

Durning, "What's Your Walk Score? (Car-less #30)," Jul. 26, 2007, URL=http://www.sightline.org/daily_score/archive/2007/07/26/what2019s-your-walk-score-car-less-30, download date Aug. 27, 2007, 2 pages.

Durning, "One Mile from Home #2," Apr. 5, 2006, URL=http://www.sightline.org/daily_score/archive/2006/04/05/one-mile-from-home, download date Aug. 27, 2007, 3 pages.

Durning, "Googling Google #20," Oct. 11, 2006, URL=http://www.sightline.org/daily_score/archive/2006/10/11/googling-google-carless-19, download date Aug. 27, 2007, 3 pages.

Nozzi, "Measuring Walkable Urbanity," URL=http://www.walkablestreets.com/urbanity.htm, download date Aug. 13, 2007, 4 pages.

Victoria Transport Policy Institute TDM Encyclopedia, "Evaluating Nonmotorized Transport: Techniques for Measuring Walking and Cycling Activity and Conditions," URL=http://www.vtpi.org/tdm/tdm63.htm, download date Aug. 28, 2007, 51 pages.

"Chapter 2—Descriptive Statistics," <www.valdosta.edu/~alazari/math2620/Classmaterials/Chapter2-1.PDF>, Mar. 1, 2005, 6 pages.

CampaignMoney.com, "Campaign Finance—Money, Politics, Campaign Finance," <http://www.campaignmoney.com/finance.asp?type=iz>, Aug. 22, 2006, 3 pages.

Shilton, L. and Zaccari, A. The Avenue Effect, Landmark Externalities, and Cubic Transformation: Manhattan Office Valuation. Journal of Real Estate Finance and Economics, 8: 151-165. 1994.

Final Office Action for U.S. Appl. No. 12/151,724, Mail Date Oct. 18, 2011, 31 pgs.

Non Final Office Action for U.S. Appl. No. 12/151,724, Mail Date Mar. 15, 2011, 20 pgs.

Non Final Office Action for U.S. Appl. No. 12/151,724, Mail Date Nov. 16, 2012, 30 pgs.

Notice of Allowance for U.S. Appl. No. 12/151,724, Mail Date Jan. 31, 2014, 15 pgs.

Final Office Action for U.S. Appl. No. 12/151,724, Mail Date Jun. 17, 2013, 33 pages.

* cited by examiner

Fig. 7

SYSTEMS, TECHNIQUES, AND METHODS FOR PROVIDING LOCATION ASSESSMENTS

TECHNICAL FIELD

The present disclosure relates to methods and systems for providing location assessments and, in particular, to methods and systems for generating assessments for particular locations or areas based on geographic-related features associated with those locations.

BACKGROUND

A number of approaches exist for evaluating, measuring and/or expressing "walkability" of a particular region. Walkability may include various concepts, such as the quality and/or quantity of resources that support pedestrian travel (e.g., crosswalks, sidewalks, etc.), conditions that make pedestrian travel appealing and/or attractive (e.g., availability of parks or other destinations), etc. In general, a more walkable region may be considered more pedestrian friendly, more appealing to pedestrians, etc.

In one approach, walkability may be measured based on subjective opinions or impressions of pedestrians in a particular neighborhood or community. Such opinions may be collected by, for example, surveying pedestrians and/or residents that use a particular neighborhood/community. In some cases, such survey results may be quantified, so as to provide a numerical measure of walkability for a region. Such a numerical measure of walkability may be compared to a corresponding numerical measure for another neighborhood/community. This subjective approach may suffer from various inefficiencies and/or inaccuracies, such as the time and/or cost required to perform surveys, the number of pedestrians that need to be surveyed to obtain statistically significant results, etc.

In another approach, walkability may be measured based on various objective aspects associated with a particular region. For example, the topology, elements, and/or physical aspects of a given transportation network (e.g., roads, sidewalks, etc.) may be characterized based on qualities that are believed to provide a pedestrian-friendly environment, such as the connectedness of roads, the availability of crosswalks, the presence of sidewalks, etc. However, while such an approach may provide an insight into how easy it is for a pedestrian to walk from one place to another, it does not consider whether any appealing destinations for the pedestrian actually exist. In other words, even the best transportation network may not be of much use to a pedestrian if there are a lack of worthwhile destinations, such as parks, schools, stores, etc.

In another objective approach, the number of businesses within a particular region may be tallied. Such an approach provides a measure of the volume or density of potentially appealing pedestrian destinations (e.g., shops, restaurants, etc.) in a region. However, this approach may provide measures that are skewed in favor of particular locales, such as high density urban centers. In addition, because such an approach treats all businesses equally, results may be skewed by the presence of businesses that are not actually appealing destinations for the typical pedestrian (e.g., auto repair shops).

BRIEF DESCRIPTION OF THE DRAWINGS

FIG. 7 is an example screen display of a visual representation of a location assessment provided in the context of a third-party application.

DETAILED DESCRIPTION

Figure 1:
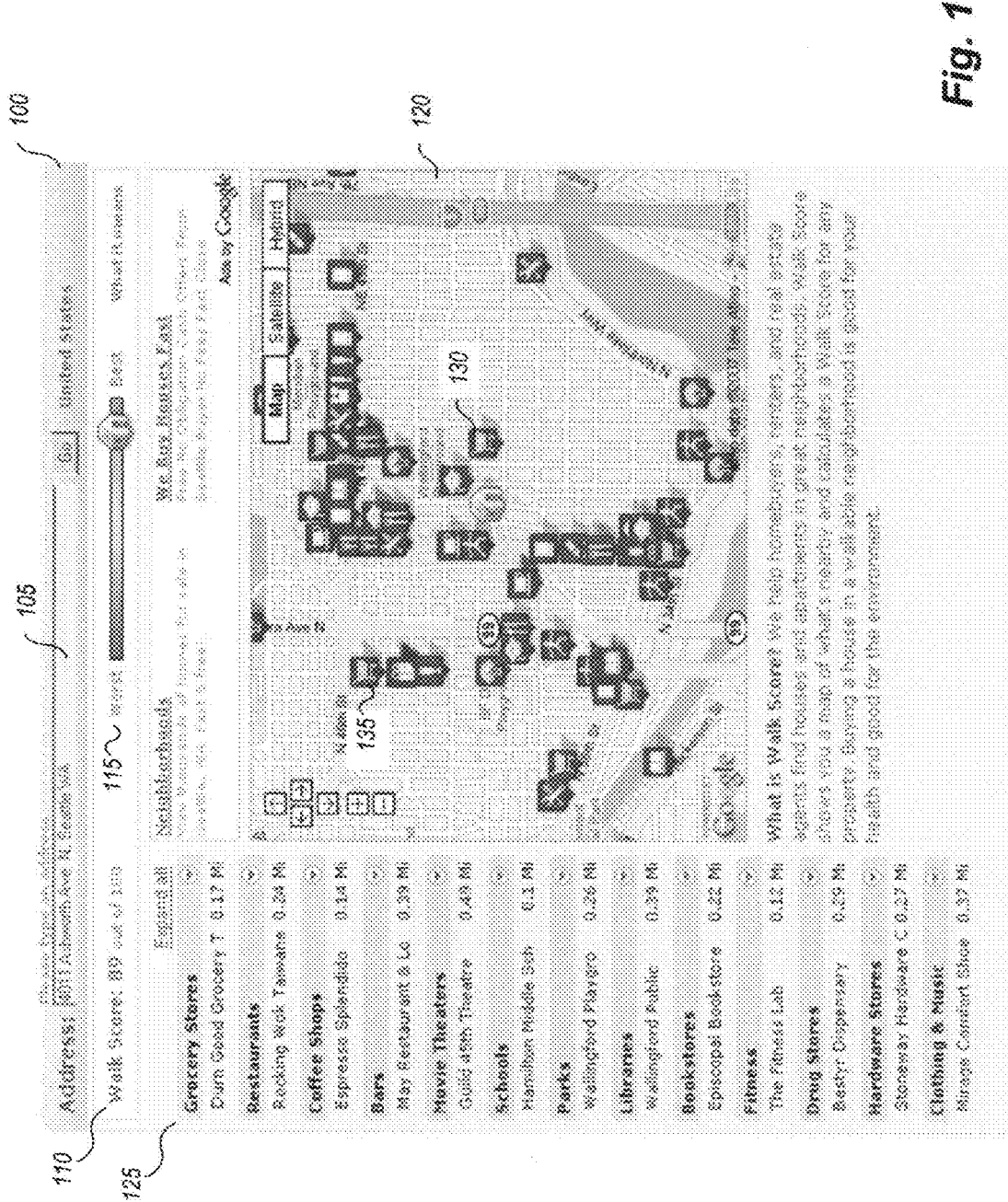
FIG. 1 is an example screen display of an example visual representation of a location assessment.

Embodiments described herein provide enhanced computer- and network-based methods and systems for generating and providing location assessments. Example embodiments provide a Location Assessment Provider System ("LAPS"), which generates and provides assessments of specified locations based on geographic-related information associated with the specified locations, as well as other factors, such as user preferences. A LAPS may be used on its own to generate and provide location assessments, or may be embedded within or used by another code module or application to provide location assessment functionality. For example, in one embodiment, the LAPS provides a walkability assessment called a "Walk Score," which provides a visual indication of features of interest local to, and walkable from, a specified address. This walkability assessment, as described further below, may be provided as a network accessible application, such as a web page specified by a Uniform Resource Identifier ("URI") and displayable via a web browser; or, may be provided via a server or as a web service and integrated into another, perhaps third party, application.

The location assessments generated by a LAPS provide indicators of various characteristics that may be associated with a specified location. In some embodiments, a LAPS may be operable to assess one or more characteristics of a specified geographic location, such as walkability, bikeability, public transit quality or availability, number of nearby business, consumer, and/or recreation destinations, safety, climate, social/economic/political conditions, etc. For example, in some embodiments, a LAPS provides an assessment that indicates the desirability of a specified location, such as a residence, in terms of its walkability or bikeability to locations of interest within a particular distance from the location. In other embodiments, the LAPS may provide an assessment that indicates desirability of a specified location in terms of safety, access to public transit, political climate, vibrancy, popularity, and/or other characteristics. In addition, in some embodiments, the LAPS may use multiple characteristics to generate a single location assessment indicative of the multiple characteristics. For example, the LAPS may provide a composite assessment, such as a "neighborhood assessment" or a "city assessment" based on walkability, safety, and/or political conditions.

As mentioned, a location assessment is generated relative to a specified location. A location used to serve as a basis for generating a location assessment may be specified by any suitable means, including explicitly specified, for example, using identifying information such as a physical address, a latitude/longitude specification, or an indication on a map. A location may also be implicitly specified, for example, by deducing a nearest building to an activity or by a user interacting (e.g., clicking on, selecting, and/or hovering over, a point) using an interactive mapping application. Other means of specifying locations relative to some other point or area may also be incorporated into a LAPS, such as by allowing a user to drag icons, draw areas, or perform other operations within an interactive mapping application.

Location assessments may be generated based on various types of information about, or associated with, the specified geographic location, including the existence, location, category, and/or other attributes of one or more geographic-related features. Geographic-related features may be concrete or abstract features associated with a location. Concrete geographic-related features (e.g., geographic-related entities) may include human-built and/or naturally occurring objects, such as educational institutions (e.g., universities, elementary schools, etc.), businesses (e.g., restaurants, coffee shops, retailers, gas stations, etc.), and parks; services (e.g., wireless access points, outdoor seating, etc.); transportation elements, such as roads (e.g., highways, streets, etc.), fixtures (e.g., bridges, steps, etc.), and other transportation features (e.g., public transit access points, pedestrian/bike paths and/or trails, pedestrian-only streets, bicycle parking, presence and/or average cycle time of stoplights); topography (e.g., hills, rivers, lakes, mountains), etc. Abstract geographic-related features may include measurable or otherwise describable aspects of, or associated with, a particular geographic location, including environmental conditions (e.g., temperature, rainfall, air quality, etc.), economic indicators (e.g., average salary of residents at a location, average revenue of businesses at a location, etc.), social conditions (e.g., crime statistics and/or events, political affiliations, religious affiliations, cultural/ethnic distributions, etc.), etc. In addition, location assessments may be generated with respect to "virtual" geographic locations, such as those provided by virtual reality environments, game environments (e.g., multiplayer role playing games), social networks, etc.

FIG. 1 is an example screen display of an example visual representation of a location assessment. In particular, FIG. 1 illustrates a location assessment screen 100 that provides a user with various information regarding and/or views of a particular location assessment. The location assessment illustrated in FIG. 1 is a location assessment that expresses a measure of walkability for a location identified by a particular address. The location assessment screen 100 includes a user input control 105 for specifying the location, a walkability score ("Walk Score") 110, a walkability scale 115, a walkability map 120, and a local feature directory 125.

According to the example application illustrated by FIG. 1, a user specifies a location as a street address via the user input control 105, and in response, the LAPS provides the illustrated location assessment. The walkability score 110 is a measure, on a scale of 0 to 100, of the walkability of an area surrounding the provided street address; hence it is referred to as a "Walk Score." The walkability scale 115 presents the walkability score 110 as a position on a scale, with higher walkability scores being presented further rightwards on the scale. In some embodiments, the walkability scale 115 may also make use of colors, such as by using a spectrum of colors from red (e.g., reflecting low walkability scores) to green (e.g., reflecting high walkability scores). In other embodiments, shades of gray or other techniques may be utilized to provide a user with an intuitive understanding of the determined walkability score.

In the example of FIG. 1, the walkability score 110 is determined based on the sum of the distances between the specified address and each of multiple geographic-related entities situated within a one mile radius of the specified street address. In order to compute a walkability score, the LAPS evaluates the multiple geographic-related entities relative to a set of categories used to group the various geographic-related entities that could be present. The LAPS determines the multiple geographic-related entities by identifying (e.g., searching for), for each of multiple categories of geographic-related entities, the single geographic-related entity that is a member of the category, that is situated within the one mile radius of the specified street address, and that is nearest to the specified street address, as compared to other geographic-related entities of the same category. For any given category, if no geographic-related entity exists that is within the one mile radius, then that category provides no (zero) contribution to the determined walkability score. In other embodiments, if no geographic-related entity exists for a particular category, then that category may provide a negative contribution to the determined walkability score or a proportionally smaller (perhaps even infinitesimal) contribution to the determined walkability score. Other embodiments also may use other distance criteria, other algorithms for determining the measure of walkability, etc.

In FIG. 1, the categories of geographic-related entities that are used by the LAPS are shown in the local feature directory 125. In particular, each category reflects a type of geographic-related entity that may be a destination of interest to a pedestrian. In the illustrated example, the categories include grocery stores, restaurants, coffee shops, bars, movie theaters, schools, parks, libraries, bookstores, fitness centers, drug stores, hardware stores, and clothing/music stores. A particular geographic-related entity, such as a store, may belong to more than one category. For example, a particular grocery store may include a deli/cafeteria and a coffee counter, and as such may belong to the grocery store category, the coffee shop category, and the restaurant category.

For each category in the local feature directory 125, information (e.g., name, address, telephone number, distance from the specified street address, etc.) about the particular geographic-related entity that was used as a basis for the determined walkability score is presented. For example, for the category of grocery stores, the name ("Durn Good Grocery") and distance (0.17 miles) of a particular grocery store is displayed. In other embodiments, other categories may be used, or the categories may be user-selectable, so as to provide a walkability score that is customizable based on personal preferences of the user.

In addition, indications of the multiple geographic-related entities used by the LAPS to determine the displayed walkability assessment are provided using symbols, such as icon 130, placed on the walkability map 120. For example, icon 130 is a grocery cart icon indicating the presence and location of a grocery store, in this case, the grocery store nearest the specified address. The map 120 also includes icons that indicate the presence and location of other geographic-related entities that were not used as a basis for determining the determined walkability score, but are nonetheless located within the one mile radius from the specified street address. In other embodiments, only the geographic-related entities that were used as a basis for determining the walkability score may be displayed. Other combinations are also possible, including those defined by user preferences.

In some embodiments, various of the illustrated user interface features may be user selectable, so that a user can interact with the user interface element to invoke additional functionality of the LAPS. For example, a user may be able to select (e.g., click on and/or hover over with a pointing device) any of the icons in order to obtain additional information about the geographic-related entity represented by the selected icon, such as hours of operation, contact information (e.g., street address, telephone number, etc.), advertisements (e.g., daily specials, menus, etc.), reviews and/or ratings (e.g., provided by users of the LAPS and/or by a third-party information provider, such as a social/peer review Web site), etc. In addition, a user may be able to select any of the categories in the feature directory 125 to obtain indications of additional geographic-related entities in that category.

Although at least some of the embodiments described herein are discussed primarily with respect to determining walkability assessments for specified locations, other embodiments may determine location assessments for other characteristics associated with specified locations or for an area that is inclusive of a location. For example, at least some of the described techniques may be utilized to determine bikeability scores that may be used by bicycle users to understand the quality and/or availability of bicycle travel at or near a given location. Generating a bikeability score may take a different set of geographic-related features into account. For example, generating a bikeability score may additionally be based on features such as topography (e.g., hills), weather (e.g., average rainfall), transportation features (e.g., availability of bike paths), etc. Two other example location assessments, safety assessments and political assessments, are described with reference to FIGS. 11-13, below. Other types of location assessments are contemplated, including runnability (e.g., how attractive a given location is for running/jogging), vibrancy (e.g., how popular and/or dynamic the social atmosphere is around a given location), etc. Further, other areas for location assessments are contemplated, such as an aggregate (sum, average, etc.) location assessment of a larger location (than a point location), for example, a zip code area, a neighborhood, a city, a state, a country/region, etc.

Furthermore, although walkability assessments are typically described with reference to the consideration of geographic-related entities (e.g., concrete geographic-related features), some embodiments may take abstract geographic-related features (e.g., weather conditions, topography, crime statistics, etc.) into account as well. In addition, because the presence or absence of other pedestrians may itself impact a person's subjective impression of walkability, the LAPS may consider such information as another category of geographic-related feature, such as by utilizing census data which provides information about the modes of transport typically used by persons living at various locations (e.g., whether people in a given census tract typically walk, bike, or talk public transit to work).

In addition, although some of the described embodiments determine location assessments with respect to a given street address, locations may be specified in other ways. For example, locations may be specified by partial physical addresses (e.g., street intersections, block addresses), latitude and longitude coordinates, based on one or more user inputs (e.g., indicating a location on a map), or via some other coordinate system. In addition, locations are not limited to "point" locations, and can equivalently be areas, such as neighborhoods, cities, regions (e.g., western Washington state), states, countries, etc. Also, some embodiments may determine location assessments for multiple locations specified in bulk or batch form. Other permutations and combinations are contemplated.

In the following description, numerous specific details are set forth, such as data formats, network protocols, and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine and/or system.

Figure 2:
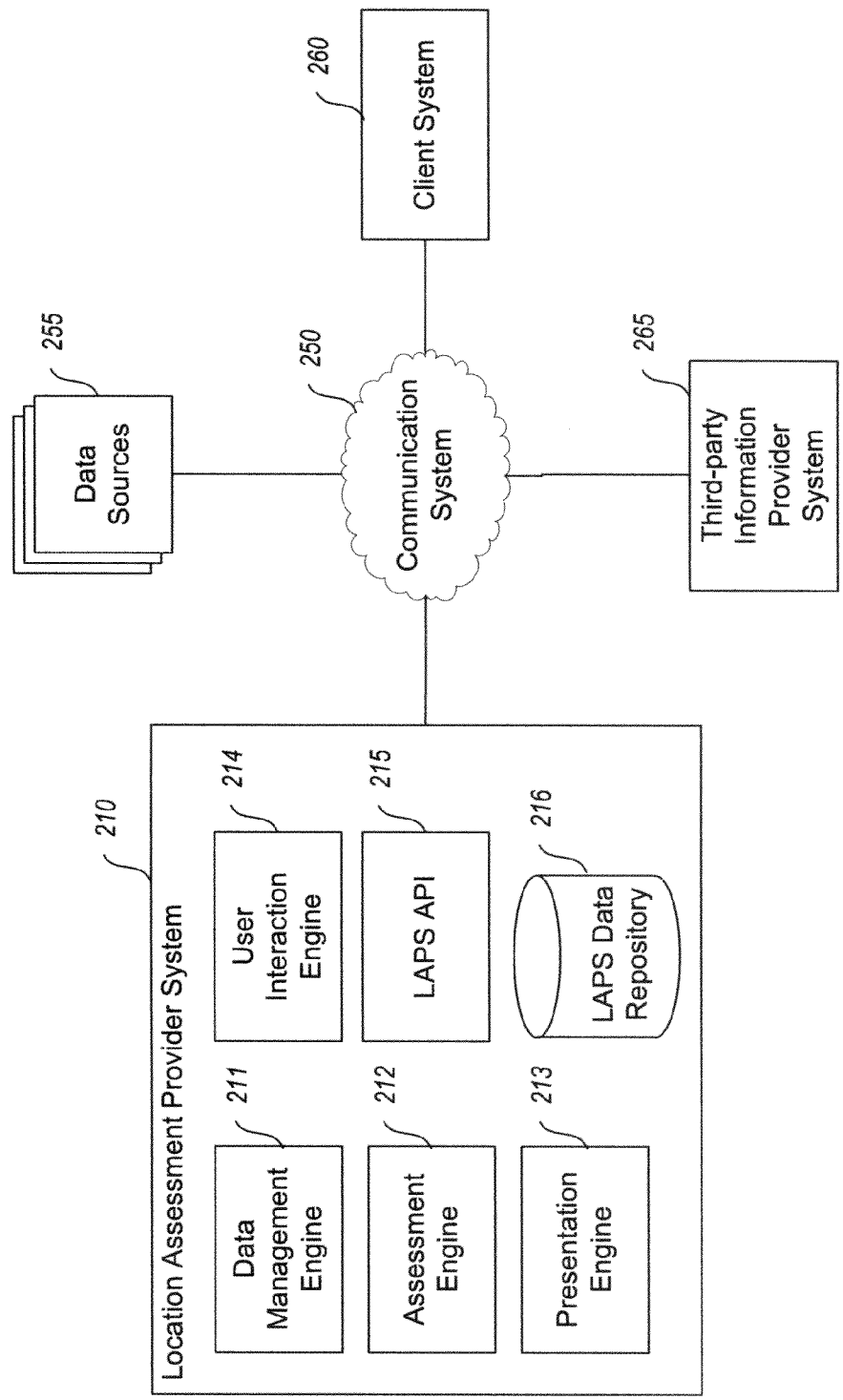
FIG. 2 is an example block diagram of modules or components of an example embodiment of a Location Assessment Provider System.

FIG. 2 is an example block diagram of modules or components of an example embodiment of a Location Assessment Provider System. In some embodiments, the LAPS comprises one or more functional components/modules that work together to generate and provide assessments for specified locations, such as the walkability assessment described with reference to FIG. 1. These modules may be implemented in software, firmware, and/or hardware, alone or in various combinations. FIG. 2 shows a LAPS 210 comprising a data management engine 211, an assessment engine 212, a presentation engine 213, a user interaction engine 214, a LAPS API ("Application Program Interface") 215, and a LAPS data repository 216. The LAPS 210 may be communicatively coupled, via a communication system 250, to one or more data sources 255, a client system 260, and a third-party information provider system 265.

The data management engine 211 manages geographic-related information for use by other modules of the LAPS 210. Managing geographic-related information may include obtaining such information from the one or more data sources 255, and storing such obtained information in the LAPS data repository 216 for access by other modules of the LAPS 210. Managing geographic-related information may also include determining the quality of (e.g., detecting errors in) obtained information, rectifying (e.g., correcting, adjusting, etc.) erroneous information, and/or otherwise manipulating (e.g., formatting, translating, etc.) obtained information, such that information obtained from distinct data sources may be used or processed in a uniform and consistent manner. In some embodiments, erroneous information may be identified and/or corrected in various ways, such as based on user-provided feedback. While, in the examples illustrated, the data management engine 211 pre-fetches geographic-related information for storage in the LAPS data repository 216, in other embodiments the data management engine 211 may also or alternatively provide a uniform interface with which other modules of the LAPS 210 may obtain on-demand information from at least some of the one or more data sources 255.

The user interaction engine 214 facilitates user access to, and customization of, various features of the LAPS 210. In particular, a user utilizing the client system 260 may interact with the LAPS 210 via the user interaction engine to provide street addresses or other indications of locations in order to obtain location assessments for those locations. For example, a request for an assessment of a specified location may be generated by the client system 260 (e.g., by a Web browser executing on the client system) and communicated to the user interaction engine 214. The user interaction engine 214 then forwards the received request to the assessment engine 212. In response, the assessment engine 212 generates an assessment of the specified location and provides it to the client system 260, either directly, via the user interaction engine 214, or some other module. The user interaction engine 214 may also provide user management functionality, such as the establishment and management of user accounts that may be used to store user customizations, preferences (e.g., display preferences, indications of frequently assessed locations, etc.), and/or other user-related information (e.g., payment information when access to the LAPS 210 is provided in exchange for payment). Such user-related information may be stored by the user interaction engine 214 in the LAPS data repository 216 for access by other modules.

The assessment engine 212 generates location assessments in response to provided indications of locations. As noted above, the assessment engine 212 may receive indications of locations from the user interaction engine 214. It may also receive indications from other sources, such as directly from client systems 260, the LAPS API 215, and/or third-party information providers 265. The assessment engine 212 may utilize services provided by other illustrated modules, such as the presentation engine 213, the data management engine 211, etc. For example, the assessment engine 212 may generate assessments based on information stored in the LAPS data repository 216 (e.g., information about geographic-related features associated with the indicated location) and/or information received from the one or more data sources 255 (e.g., searching for and obtaining information about geographic-related features from a search engine or other network-accessible information provider).

The presentation engine 213 generates representations of location assessments provided by the assessment engine 212. Such representations may include visual representations, such as graphical maps of a specified area that are possibly augmented in various ways (e.g., with one or more icons indicating geographic-related entities, color coding, etc.), scores (e.g., a number), graphical scales, textual descriptions (e.g., a text describing a particular assessment, etc.), etc. The generated representations may also be in non-visual forms, such as audio messages for the visually impaired describing an assessment that may be automatically generated via text-to-speech translation or other mechanisms. The presentation engine 213 may also generate representations of location assessments based on user preferences stored in the LAPS data repository 216, so as to provide customized views that are specialized for particular client systems (e.g., PDAs, cell phones, etc.) and/or user preferences.

The LAPS API 215 provides programmatic access to various features and/or functions of the LAPS 210. For example, the LAPS API 215 may provide a programmatic interface by which remote computing systems may programmatically interact with the LAPS 210, such as by allowing the third-party information provider system 265 to access one or more services provided by the assessment engine 212 in order to provide location assessments in the context of some other application. In one embodiment, the third-party information provider system 265 may include a Web site and/or other software application that provides real estate services to client systems 260. The third-party information provider system 265 may incorporate (e.g., embed) assessments of locations (e.g., listed properties and their surrounding areas) along with other information about those locations, such as property details, asking prices, etc. In addition, the API 215 may also provide programmatic interface to a client application utilized by a user to interact with the LAPS 210 in various ways. For example, the functionality exposed via the API 215 may support the development of custom applications operating on portable client devices (e.g., smart phones, PDAs, pagers, etc.), custom hardware (e.g., kiosk-based systems), etc. Furthermore, the API 215 may support the "bulk" acquisition of assessments for large numbers of distinct locations, possibly in exchange for payment.

The client system 260 may include various types of computing systems. For example, in one embodiment the client system 260 may be a desktop computing system executing a Web browser that may be used by a user to interactively obtain information from the LAPS 210. In another embodiment, the client system 260 may be a mobile computing device (e.g., a mobile phone, PDA, etc.) having location aware functionality (e.g., a GPS system). In such a case, the client system 260 may, either automatically (e.g., on a periodic basis, at a specific time, upon the occurrence of a particular event, etc.) or in response to a user request (e.g., a button press), provide an indication of a current location of the client system 260 to the LAPS 210 in order to obtain an assessment for the current location and to display such to the user. For example, a GPS-capable mobile phone may periodically (e.g., every minute) provide an indication of the current location of the mobile phone to the LAPS 210 in order to obtain and display a continuously updated, current location assessment to a user who is traveling about a city or other area. As noted above, location assessments need not necessarily be visually presented. For example, a mobile phone client device may beep or vibrate when a particular location assessment crosses some predetermined or selected threshold. For example, in the context of safety assessments, a mobile phone may vibrate when a safety assessment of the current location of the mobile phone drops below a particular threshold, in order to notify a user that they are entering a potentially unsafe neighborhood.

Figure 3:
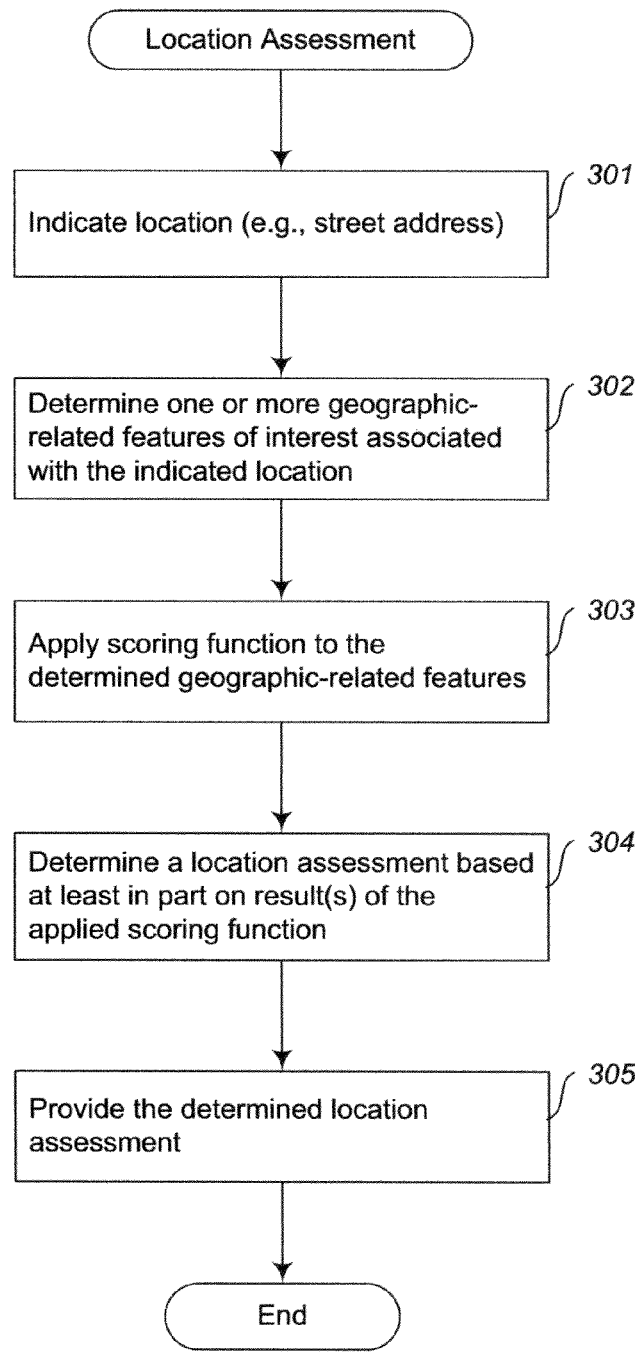
FIG. 3 is an example overview flow diagram of a process for providing an example location assessment using an example embodiment of a Location Assessment Provider System.

FIG. 3 is an example overview flow diagram of a process for providing an example location assessment using an example embodiment of a Location Assessment Provider System. The illustrated routine may be performed by the LAPS 210, described with reference to FIG. 2 to generate, for example, the walkability assessment described with reference to FIG. 1. The illustrated process demonstrates the generation and provision of location assessments in response to received indications of locations (e.g., street addresses), such as may be received from Web browsers executing on the client system 260.

More specifically, in step 301 the LAPS receives an indication of a location such as a street address. In step 302, the LAPS determines one or more geographic-related features of interest associated with the indicated location. As noted, geographic-related features may be concrete (e.g., shops, schools, roads, etc.) or abstract (e.g., average weather conditions, crime statistics, etc.). The one or more geographic-related features of interest may be determined in various ways, such as by selecting one or more geographic-related features that are of a particular category or categories and/or that are nearest, by some distance function (e.g., straight line distance), to the indicated location. The actual category or categories used may be based at least in part on the particular application. For example, in the context of walkability assessments, various types of businesses (e.g., restaurants, retailers, etc.), educational institutions (e.g., schools, universities), and public spaces (e.g., parks) may be considered. In the context of safety assessments, crime statistics and health and safety services (e.g., fire stations, police stations) may be considered. In addition, the category or categories used may be user-selectable (e.g., via user preferences) and/or based on other factors, such as regional/national differences (e.g., in some countries, exercise facilities such as indoor gyms may typically not be considered interesting destinations). In some embodiments, determining the one or more geographic-related features may also include filtering or otherwise excluding those geographic-related features that are not within a particular area associated with the indicated location (e.g., as defined by a fixed radius from the location, the boundaries of the zip code of the location, etc.).

In step 303, the LAPS applies a scoring function to the determined one or more geographic-related features. Such a scoring function may determine an overall score by summing a weighted contribution from each of the determined geographic-related features. For example, the scoring function may sum the inverse of the distances measured between the indicated location and each of the determined geographic-related features. In some cases, such as when some of the geographic-related features do not have an associated point location (e.g., average weather conditions, aggregate crime statistics, etc.), the geographic-related features may be weighted in a manner based on other factors, such as seriousness of crime, severity of weather, etc. In general, distinct categories of geographic-related features may contribute to the scoring function differently, based on user preferences/feedback (e.g., a particular user may decide that a park represents a more desirable destination than a shoe store), cultural/social/regional norms (e.g., particular target users may value bars and nightclubs more highly than childcare facilities), purpose of location assessment use, etc. In addition, specific geographic-related features (e.g., a particular bar or restaurant) may contribute to the scoring function based on information about the specific geographic-related feature (e.g., a restaurant review for a particular restaurant may contribute positively, negatively, or otherwise enhance or diminish the result of the scoring function). Also, for some uses, specific geographic-related features (e.g., a large park in a low population area) may be deemed to contribute little if nothing to an aggregate value (e.g., for a composite city or region score), so as to not disproportionately skew results.

In step 304, the LAPS determines a location assessment based at least in part on the result or results of the applied scoring function. For example, determining the location assessment may include generating a visual representation of the assessment. Such a visual representation may include numerical representations (e.g., the score provided by the scoring function), verbal descriptions (e.g., "Great," "Good," "Average," "Poor," etc.), letter grades (e.g., "A," "B," "C," etc.), symbolic representations (e.g., a star-rating system, where a greater number of stars reflects a better or higher assessment), graphic/iconic/symbolic representations (e.g., a map with icons representing nearby geographic-related features, etc.).

In step 305, the LAPS provides the determined location assessment. Providing the determined location assessment may include providing (e.g., communicating, transmitting, sending, forwarding, etc.) the location assessment to a client application, such as a Web browser executing on a client system 260.

Figure 4:
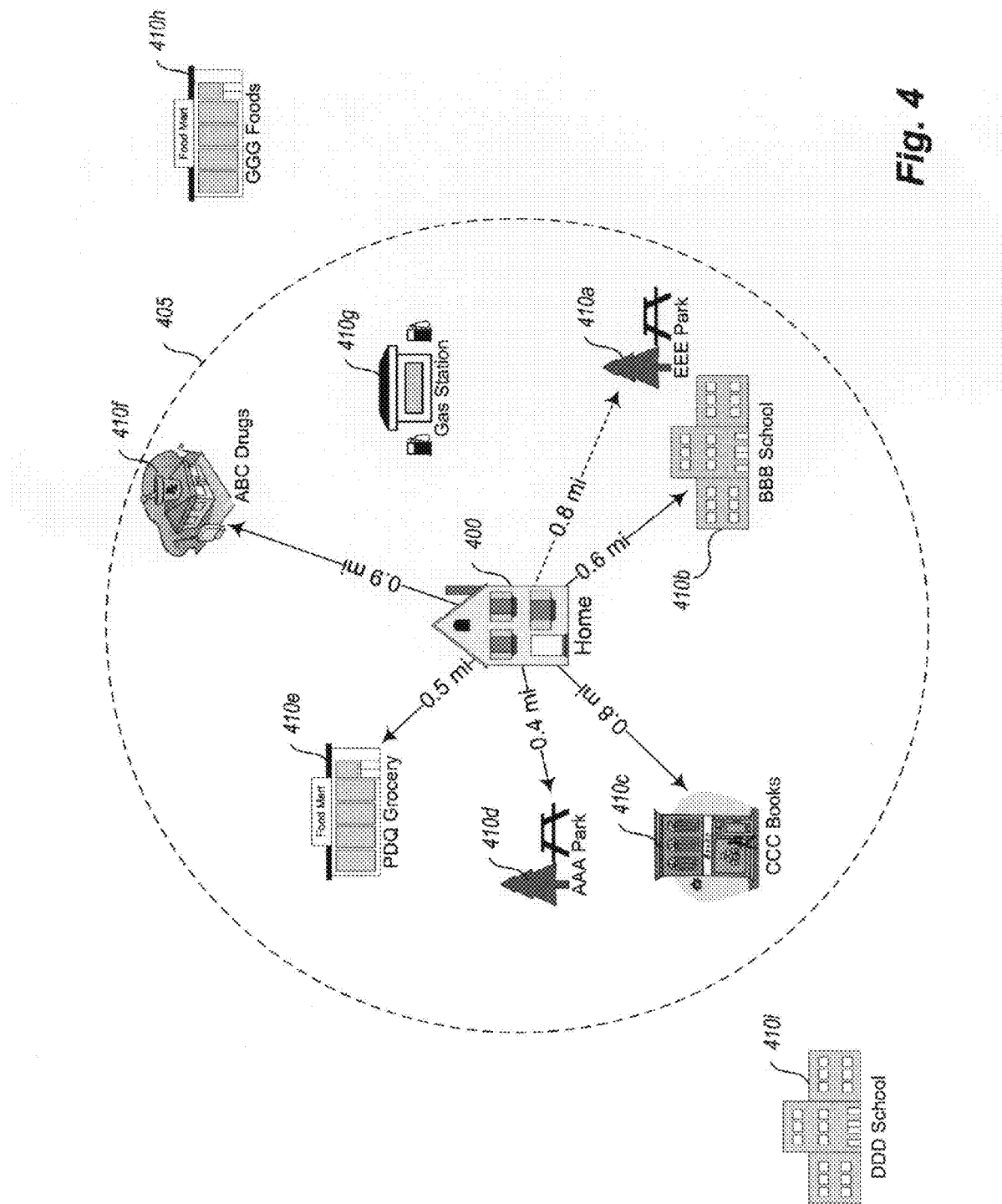
FIG. 4 is a conceptual block diagram illustrating the generation of a location assessment based upon determined geographic-related features.

FIG. 4 is a conceptual block diagram illustrating the generation of an example walkability assessment based upon determined geographic-related features. In particular, FIG. 4 illustrates a location 400, an area 405, and identified multiple geographic-related entities 410a-410i with respect to which an example walkability assessment can be generated. In the example of FIG. 4, the location 400 is a residence (e.g., a home), but could be any location (e.g., as specified by a street address, latitude/longitude coordinates, etc.).

The area 405 is defined by a one mile radius around the location 400. The one mile radius may be appropriate in the context of providing walkability assessments, because one mile is a distance that an average user can walk in a reasonable time. However, in other embodiments, other units (e.g., city blocks, metric units, etc.), shapes (e.g., rectangular areas or polygons), and/or distances may be used, possibly based on the target country, user, and/or application. For example, specific users, such as the injured and/or impaired, may prefer a shorter distance. Alternatively, a longer distance, such as three to five miles, may be appropriate for other contexts, such as providing bikeability assessments, because an average bike rider can typically cover more ground than a walker could in the same amount of time.

In the example of FIG. 4, only geographic-related entities situated within the area 400 are considered for purposes of generating the walkability assessment. Geographic-related entities 410a-410g are situated within the area 405, and therefore may be considered for purposes of generating the walkability assessment. On the other hand, geographic-related entities 410h-410i are not situated within the area 405, and are therefore excluded from consideration. In other examples, geographic-related entities that are partially situated within the area 405 may be considered or excluded from consideration. For example, property data (e.g., parcel boundaries, zoning data, land-use boundaries, etc.) may be utilized to obtain more precise estimates of the actual geographic bounds of the various geographic-related entities, so as to not falsely exclude a geographic-related entity having a "point-based" street address that is outside of the area 405, but that sits on a land parcel that overlaps the area 405. As another example, a playground feature located in a larger park that is partially situated within the area 405 may be excluded because the feature of interest is out of range.

In addition, the illustrated walkability assessment is category-based, such that only geographic-related entities of particular categories are considered for purposes of generating the walkability assessment. The categories used in the example of FIG. 4 include parks, schools, book stores, grocery stores, and drug stores, but do not include gas stations, because such geographic-related entities typically may not be appealing destinations for pedestrians (albeit in some scenarios they may be). Therefore, because geographic-related entity 410g is a gas station, it is not considered for purposes of generating the location assessment, as illustrated by the lack of an arrow connecting the location 400 to the gas station 410g.

Furthermore, the illustrated walkability assessment utilizes only the geographic-related entity of each category that is closest to the location 400. For example, there are two parks 410a and 410d located within the area 405, having respective distances from the location 400 of 0.8 miles and 0.4 miles.

Because park 410*a* is the more distant of the two parks, it is not considered for purposes of the generating the assessment, as illustrated by a dashed line connecting the location 400 to the park 410*a*. By considering only one geographic-related entity per category, the illustrated example embodiment provides an assessment that favors geographic-related entity diversity (e.g., balance, completeness, etc.) over geographic-related entity density (e.g., sheer numbers of geographic-related entities). For example, an area that includes a compact village having just one or two geographic-related entities of each category will score the same, or approximately the same, as an area that includes dense urban development having dozens of geographic-related entities of each category. In addition, the illustrated technique controls for geographic-related entity category imbalances. For example, a given area, such as a university/college district inhabited by many young people, may include many bars and restaurants but few geographic-related entities of other categories, such as parks or child care facilities. Using the described technique, such an area will accordingly score lower than an area having a more balanced (e.g., diverse) assortment of geographic-related entities. In some embodiments, the diversity of geographic-related features may be analyzed without regard to the distances between an indicated location and those features. For example, the diversity or completeness of a business district may be analyzed to determine whether that business district offers a wide or narrow range of different types of stores and/or services. In other embodiments, diversity, density, and/or other statistical properties of the considered geographic-related entities may be utilized in other ways, such as by considering every geographic-related entity (rather than just the nearest one) in a given region and then adjusting a resulting score based on a measured level of diversity or other statistical property (e.g., standard deviation, variance, etc.) of the considered entities. In some embodiments, the contributions of these geographic-related entities may be further weighted, such as by other assessments (e.g., safety, political climate, etc.) or by other factors (e.g., population density).

Given the exclusions described above, the illustrated assessment is based on geographic-related entities 410*b*-410*f*, and in particular, on the distances between the location 400 and the geographic-related entities 410*b*-410*f*. In the illustrated embodiment, a score is calculated that is the sum of the multiplicative inverses (i.e., 1/distance) of the distances between the location and each of the geographic-related entities 410*b*-410*f*. By using the multiplicative inverse of the distance, the relative contribution of each distance is weighted such that it decays as a function of the distance from the location. In the example of FIG. 4, the combined score is the sum of the multiplicative inverses of the distance between the location 400 and each of the school 410*b* (1/0.6), the book store 410*c* (1/0.8), the park 410*d* (1/0.4), the grocery store 410*e* (1/0.5), and the drug store 410*f* (1/0.9), yielding a total of approximately 8.5 (1/0.6+1/0.8+1/0.4+1/0.5+1/0.9≈8.528).

In other embodiments, scores may be calculated in other ways and/or based on other factors. For example, individual distances may be weighted in other ways, such as more or less strongly based on the distance and/or other factors (e.g., the type of geographic-related feature—its category). Also, these weightings may be skewed intentionally based upon user and/or application preferences. In addition, scores may be normalized and/or scaled, such that every score falls within a predetermined range (e.g., zero to 100, zero to 1.0, etc.). In addition, scores may be calculated using various kinds of scoring functions, including various types of step functions (e.g., geographic-related features located outside of an area of interest contribute zero, while those located inside of the area of interest contribute one, or some other constant, non-zero value), weighted functions that determine scores based upon population, etc. Other example scoring functions are discussed with reference to FIGS. 10 and 16, below. Furthermore, although the example of FIG. 4 only considers a single geographic-related entity of each category, some other number of geographic-related entities per category may be considered (e.g., all geographic-related entities, three geographic-related entities, etc.), or for some categories but not others, etc.

In further embodiments, other categories of geographic-related features may be utilized instead of, or in addition to, the described categories. For example, other categories may include public transit access points (e.g., train stations, bus stops, subway stops, etc.), topography, weather, social statistics, etc. In some cases, current geographic-related information may be utilized to provide instantaneous assessments. For example, the current and/or predicted weather and/or atmospheric conditions may be considered so as to provide current and/or predicted assessments rather than average-case assessments. In such situations, a walkability score for a particular location may vary based on current/predicted conditions. Such a technique may be used, for example, to provide those having respiratory diseases with warnings to avoid walking on days with particularly poor air quality. In addition, other types of geographic-related features may be examined to provide a predictive location assessment. For example, in some embodiments, hypothetical geographic-related features may be designated (e.g., by user selection) to determine an effect on a walkability or other type of location assessment.

Figure 5:
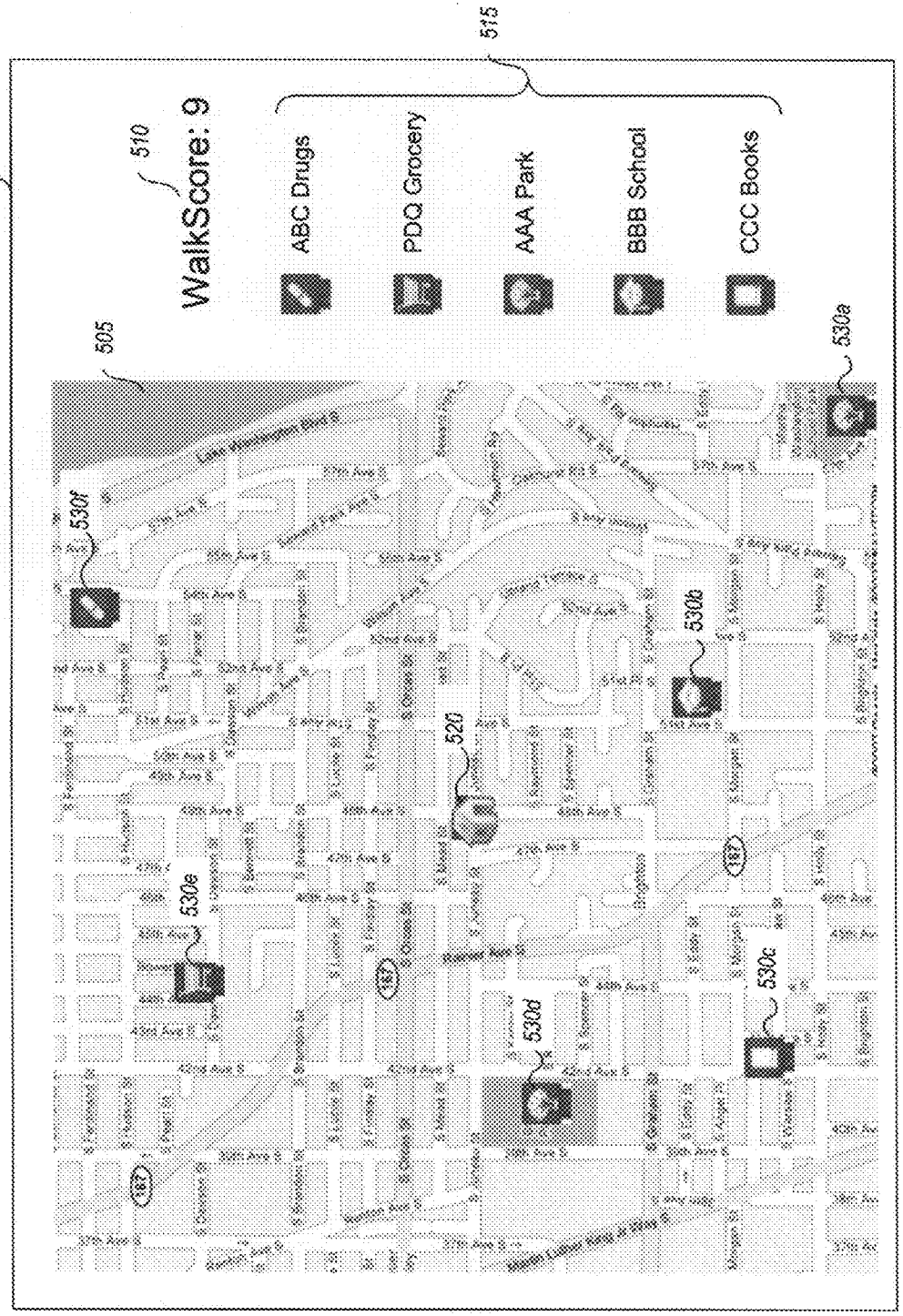
FIG. 5 is an example screen display of an example visual representation of an example walkability assessment.

FIG. 5 is a display of an example visual representation of an example walkability assessment. FIG. 5 illustrates a screen display 500 that includes a map 505, a walkability score 510, and a feature directory 515. The map 505 includes a location icon 520 and multiple geographic-related entity icons 530*a*-530*f* that respectively represent a specified location and the geographic-related entities used to determine the score 510. The illustrated screen display 500 is an example visual representation of the assessment discussed with respect to FIG. 4. In particular, the location icon 520 corresponds to the location 400, and the geographic-related entity icons 530*a*-530*f* respectively correspond to the geographic-related entities 410*a*-410*f*, of FIG. 4. In addition the score 510 is the calculated score of the example of FIG. 4, rounded to the nearest whole number.

In some embodiments, the visual representation of FIG. 5 may include additional information. For example, preferred walking routes between the location indicated by the location icon 520 and one or more of the geographic-related entity icons 530*a*-530*f* (e.g., those routes that follow roads having sidewalks, roads that have minimal vehicle traffic, etc.) may be illustrated on the map 505.

Figure 6:
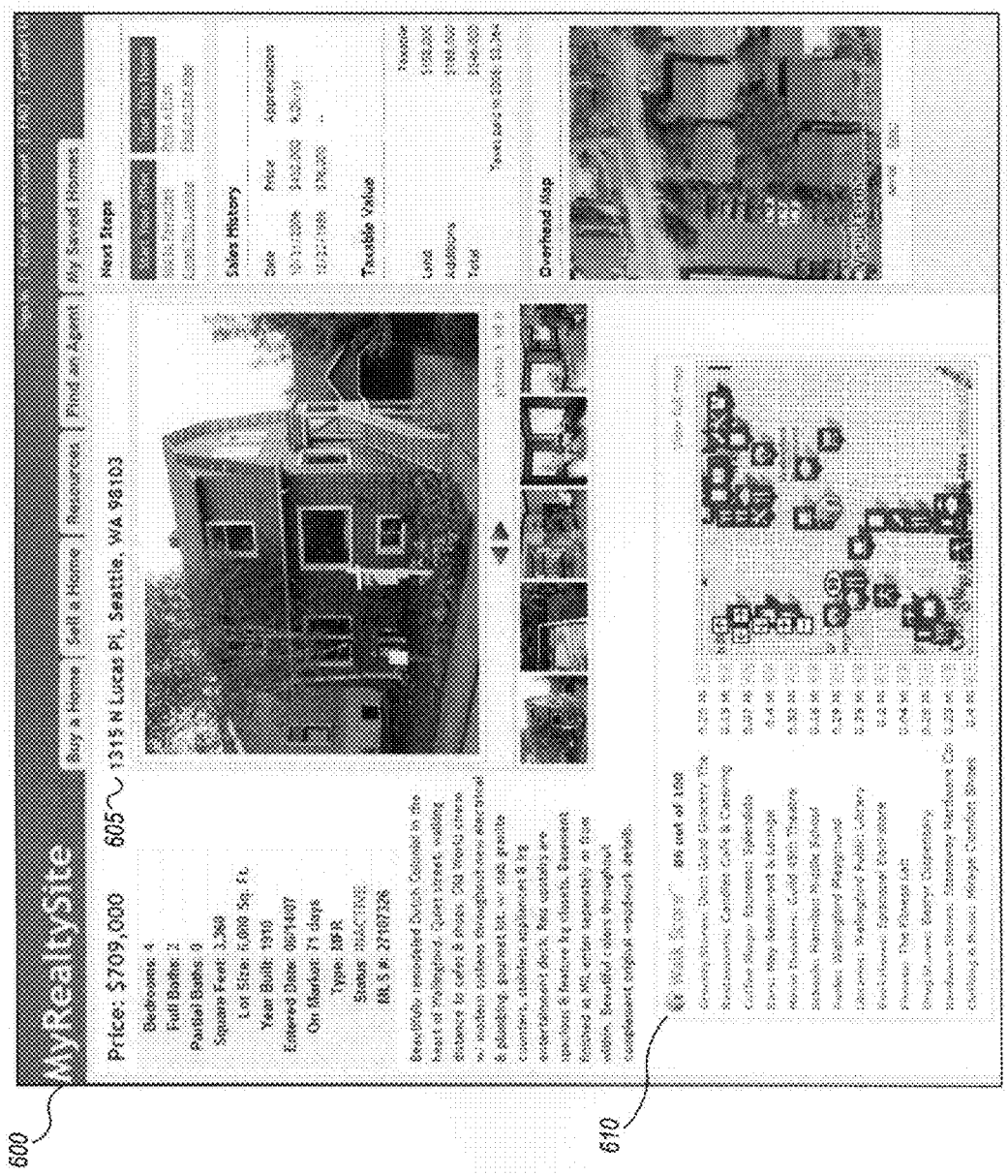
FIG. 6 is an example screen display of an example user interface element operable to provide a visual representation of a location assessment in the context of a third-party application.

FIG. 6 is an example display of an example user interface element operable to provide a visual representation of a location assessment in the context of a third-party application. In this example, a screen display 600 of a real estate Web page is illustrated. The illustrated Web page may be provided by a real estate Web site provided by, for example, one of the third-party information systems 265 in FIG. 2. As discussed with respect to FIG. 2, the LAPS may provide access to its services, such that third parties can embed or otherwise incorporate location assessments into their applications. The real estate Web site shown in FIG. 6 is an example of such incorporation.

More specifically, the screen display 600 provides listing information for a for-sale residence at a particular location 605, as well as "tile" 610, that includes a walkability assessment for the location 605. The tile 610 may be a module, component, or other code segment provided by the LAPS 210 of FIG. 2, for incorporation within third-party applications, such that a Web site or other application developer can include the tile 610 within their application in order to provide enhanced functionality to their users. In some embodiments, the third party may obtain the tile 610 in exchange for a payment (e.g., as a per-use payment, revenue sharing, etc.) or other consideration to an operator or other party associated with the LAPS.

Figure 7:
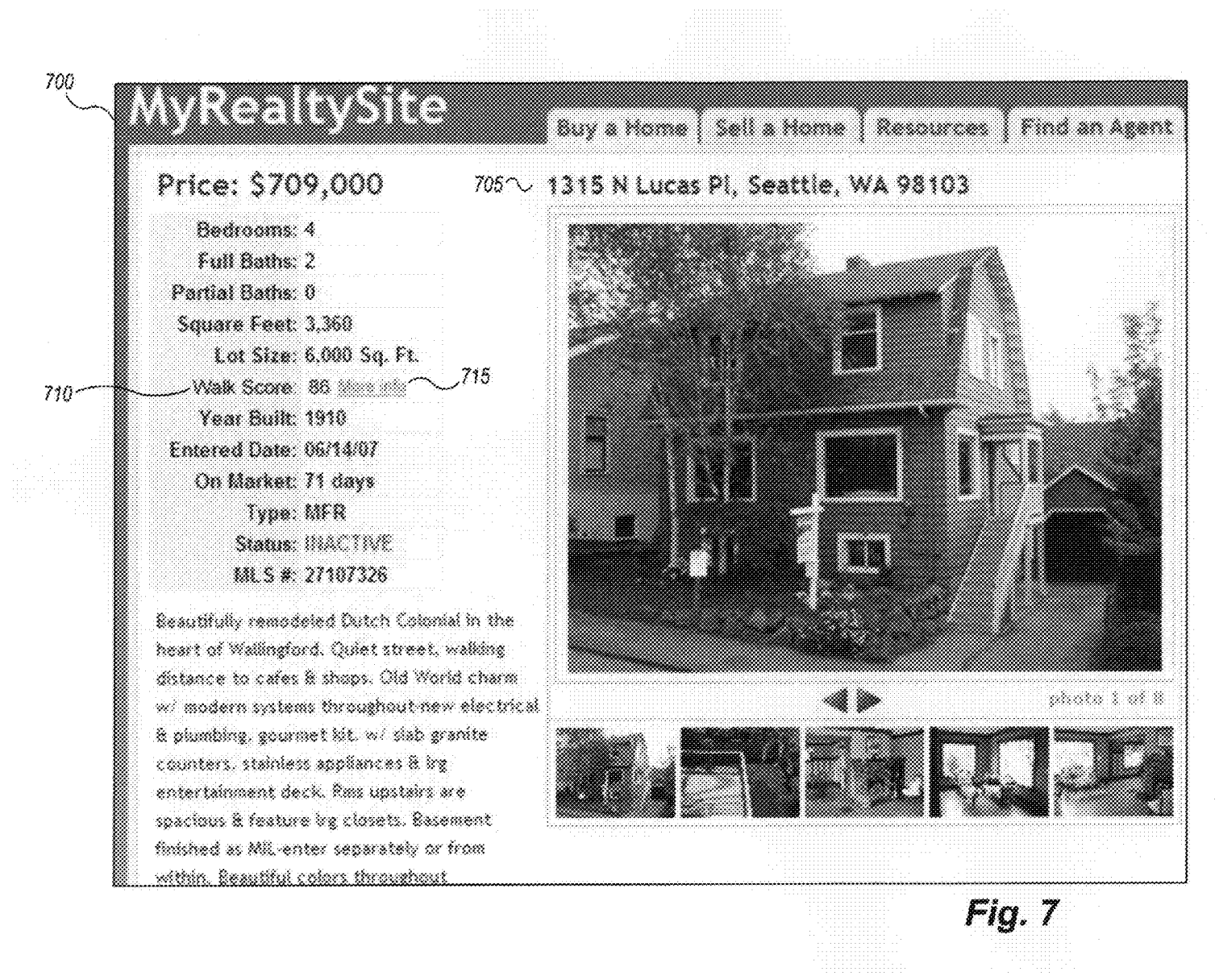

FIG. 7 is an example display of a visual representation of a location assessment provided in the context of a third-party application. FIG. 7 includes a screen display 700 that is similar to screen display 600 described with reference to FIG. 6. In particular, screen display 700 is a Web page that provides listing information for a for-sale residence at a particular location 705. However, unlike FIG. 6, the illustrated screen display 700 does not include a tile, but rather a walkability score 710 for the location 705 along with a user-selectable control 715 (e.g., a link) that a user may select to obtain additional information about a walkability assessment for the location 705. In some embodiments, a third party may obtain such a score from the LAPS, possibly in exchange for a payment or other consideration.

Although real estate services may be one target application for providing and utilizing location assessments, the described concepts and techniques may be utilized in other contexts as well. For example, a travel information Web site may utilize at least some of the described techniques to rank or rate various destinations based on assessed walkability or other characteristics. Furthermore, urban planners may utilize at least some of the described techniques to obtain information about characteristics of neighborhoods within a given urban area, such that appropriate attention may be given to improving, modifying, or otherwise developing particular neighborhoods to maximize some characteristics.

In addition, the described techniques may be employed in the context of a design or modeling tool, that can be used to predict or otherwise understand (e.g., simulate, hypothesis test, etc.) how particular location characteristics (e.g., walkability) would change if particular changes (e.g., to a neighborhood) were made, such as the addition or removal of pedestrian crosswalks, sidewalks, retail units, parkland, green spaces, etc. For example, in some embodiments, a user may add (e.g., via an interactive user interface) a hypothetical geographic-related feature (e.g., a retail establishment, a restaurant, a school, a park, a bus stop, etc.) to multiple candidate locations modeled by the LAPS, and then compare the multiple candidate locations to one another on the basis of determined location assessments that take the added hypothetical feature into account. Such comparisons may then be used to determine a best or more advantageous location for making a particular improvement and/or implementing a particular development proposal. In other embodiments, the LAPS be configured to automatically determine what type and location of geographic-related feature would, if added to or near a particular location, result in the greatest increase in assessment for the location. Other applications are also possible. Generally, the concepts and techniques described herein are applicable to any environment that could take advantage of a location assessment.

In addition, other types of visual representations are contemplated. For example, multiple location assessments may be aggregated on a single map, so as to provide an regional comparative view of location assessments. In particular, block by block (or some other unit of area, such as zip code, census tract, neighborhood, latitude and longitude intervals, list/range of addresses etc.) location assessments may be plotted on a city map, with each location assessment being represented by a color on a color scale (e.g., higher assessments being green and lower assessments being in red), so as to provide a "heat map" that allows a user to quickly determine the best and/or worst locations within the city. Example heat maps are described with respect to FIGS. 14A and 14B, below. In addition, multiple location assessments that are presented as aggregations (e.g., an average walkscore for a city, neighborhood, etc. based upon individual walkscores of one or more of its components computed by a variety of techniques) may be compared and ranked. Aggregate walkscores are described below with respect to FIGS. 15 and 16, below.

Also, although certain terms are used primarily herein, one skilled in the art will recognize that other terms could be used interchangeably to yield equivalent embodiments and examples. For example, it is well-known that equivalent terms in the geography field, in the urban planning field, and/or in other similar fields could be substituted for such terms as "geographic-related features," "location," "area," "category," "entity," etc. For example, the term "area" may be used interchangeably with "shape" and/or "region." In addition, "category" may be used interchangeably with "type." Likewise, "geographic-related feature" may be used interchangeably with "geographic aspect," "geographic attribute," and/or "geographic element." Furthermore, a "mobility assessment" may include any type of location assessment that focuses at least in part on the quality of a particular location with respect to one or more modes of transport (e.g., walking, bicycling, driving, using public transit, etc.) In addition, terms may have alternate spellings which may or may not be explicitly mentioned, and one skilled in the art will recognize that all such variations of terms are intended to be included.

Figure 8:
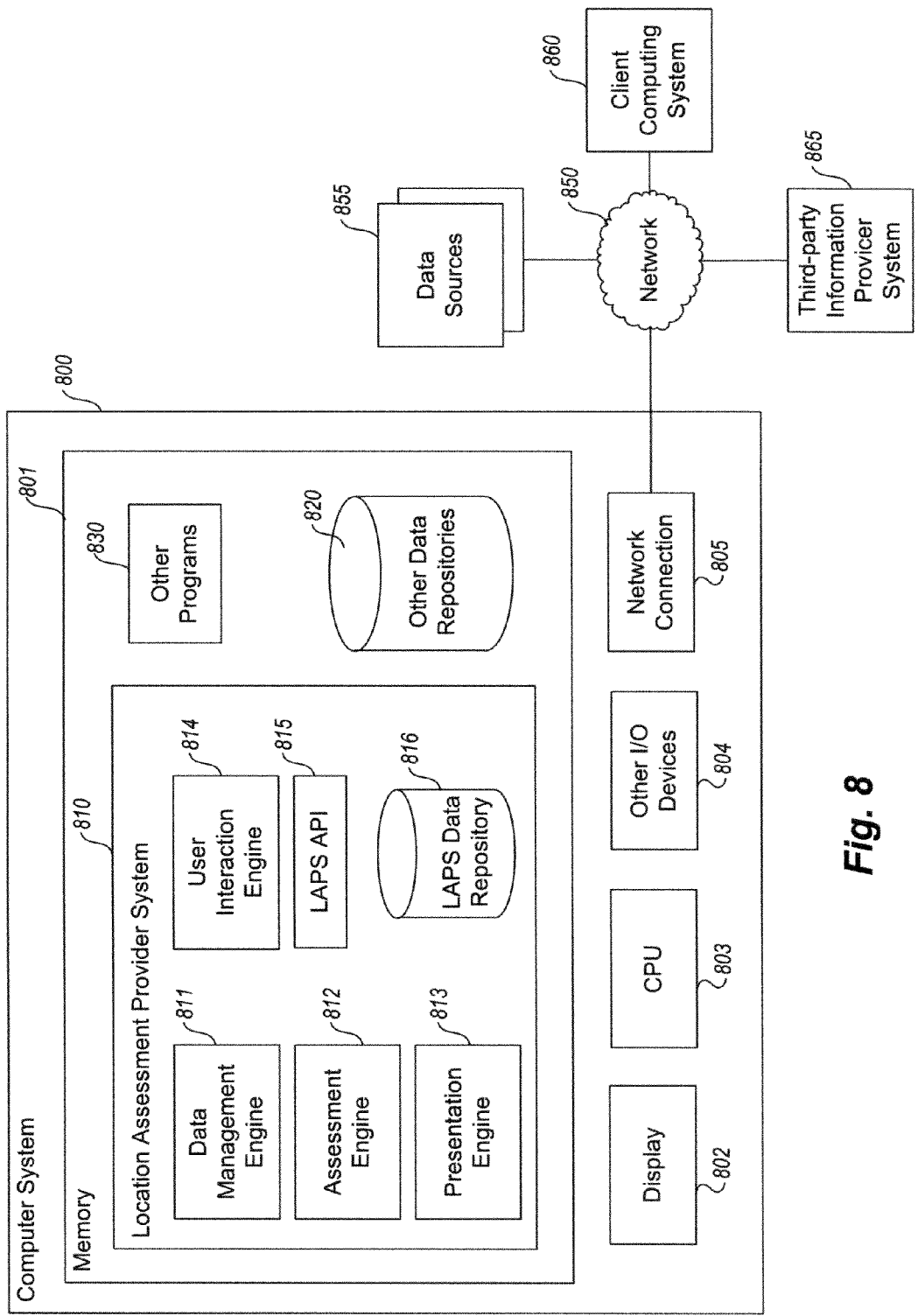
FIG. 8 is an example block diagram of a computing system for practicing embodiments of an example Location Assessment Provider System.

FIG. 8 is an example block diagram of a general purpose computer system for practicing embodiments of a Location Assessment Provider System. Note that a general purpose or a special purpose computing system may be used to implement a LAPS. The general purpose computer system 800 may comprise one or more server and/or client computing systems and may span distributed locations. In addition, each block shown may represent one or more such blocks as appropriate to a specific embodiment or may be combined with other blocks. Moreover, the various blocks of the LAPS 810 may physically reside on one or more machines, which use standard (e.g., TCP/IP) or proprietary interprocess communication mechanisms to communicate with each other.

In the embodiment shown, computer system 800 comprises a computer memory ("memory") 801, a display 802, a Central Processing Unit ("CPU") 803, and Input/Output devices 804 (e.g., keyboard, mouse, CRT or LCD display, etc.), and network connections 805. The LAPS 810 is shown residing in memory 801. The components of the LAPS 810 preferably execute on one or more CPUs 803 and manage the generation and provision of location assessments, as described with reference to FIGS. 2-7. Other code or programs 830 and potentially other data repositories, such as data repository 820, also reside in the memory 810, and preferably execute on one or more CPUs 803.

In a typical embodiment, the LAPS 810 includes a data management engine 811, an assessment engine 812, a presentation engine 813, a user interaction engine 814, a LAPS API 815, and a LAPS data repository 816. The LAPS 810 and blocks 811-816 are implementations of the LAPS 210 and modules 211-216, respectively, as described with respect to FIG. 2. Other and or different modules may be implemented.

In addition, the LAPS 810 may interact via a network 850 with data sources 855, one or more client computing systems 860, and/or one or more third-party information provider systems 865.

In an example embodiment, components/modules of the LAPS 810 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk), functional (e.g., ML, Lisp, Scheme, etc.), procedural (e.g., C, Pascal, Ada, Modula), scripting (e.g., PHP, Perl, Ruby, Python, JavaScript, VBScript, etc.), etc.

The embodiments described above use well-known or proprietary synchronous or asynchronous client-sever computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by a LAPS implementation.

In addition, programming interfaces to the data stored as part of the LAPS 210 (e.g., in the data repository 816) can be available by standard means such as through C, C++, C#, and Java APIs; libraries for accessing files, databases, or other data repositories; through scripting languages such as XML; or through Web servers, FTP servers, or other types of servers providing access to stored data. The data repository 816 may be implemented as one or more database systems, file systems, or any other method known in the art for storing such information, or any combination of the above, including implementation using distributed computing techniques.

Also, the example LAPS 810 may be implemented in a distributed environment comprising multiple, even heterogeneous, computer systems and networks. For example, in one embodiment, the modules 811-815, and the data repository 816 are all located in physically different computer systems. In another embodiment, various modules of the LAPS 810 are hosted each on a separate server machine and may be remotely located from the tables which are stored in the data repository 816. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.). Other variations are possible. Also, other functionality could be provided by each component/module, or existing functionality could be distributed amongst the components/modules in different ways, yet still achieve the functions of a LAPS.

Furthermore, in some embodiments, some or all of the components of the LAPS may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 9:
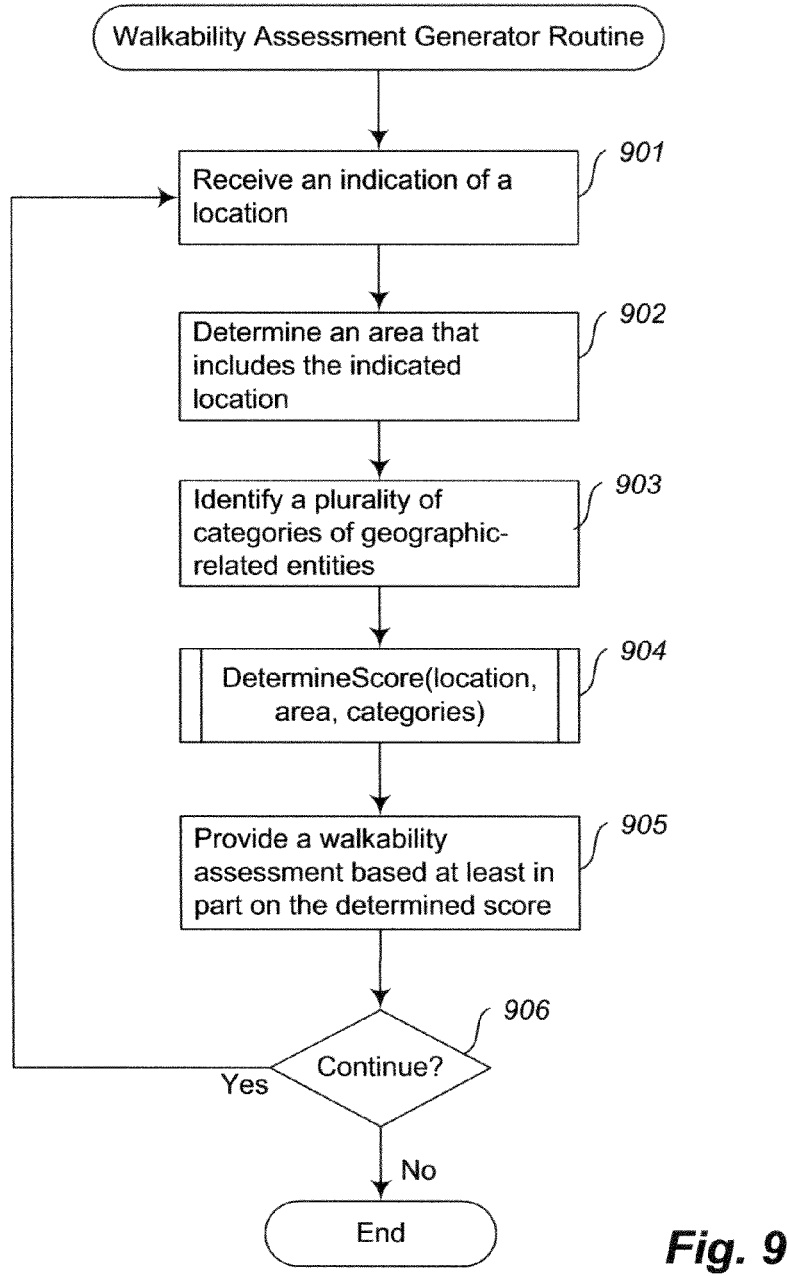
FIG. 9 is an example flow diagram of an example walkability assessment generator routine provided by an example embodiment of a Location Assessment Provider System.

FIG. 9 is an example flow diagram of an example walkability assessment generator routine provided by an example embodiment of a Location Assessment Provider System. The illustrated routine may be provided by, for example, execution of the assessment engine 812 described with reference to FIG. 8. The illustrated routine generates and provides walkability assessments in response to received indications of locations, such as may be received from Web browsers executing on client systems 860, the user interaction engine 814, and/or the LAPS API 815, as described with reference to FIG. 8. A similar assessment routine may be provided to provide a bikeability assessment, or other similar location assessments.

In steps 901-906, the routine performs a loop in which it repeatedly receives and processes a request for an assessment of a specified location. More specifically, the routine begins at step 901 where it receives an indication of a location. The location may be indicated in various ways, such as by a street address, zip code, city name, coordinates (e.g., latitude and longitude), neighborhood, county, etc.

In step 902, the routine determines an area that includes the indicated location. Different embodiments may determine different types and/or shapes of areas, such as circles, rectangles, arbitrary polygons, etc. In some cases, the area may be arbitrarily determined, for example as a fixed radius circle having the indicated location at its center. In other cases, the area may be determined with reference to different types of boundaries, including natural physical boundaries (e.g., rivers, hills, etc.), human-constructed physical boundaries (e.g., expressways, walls, canals, etc.), political boundaries (e.g., census tracts, neighborhoods, cities, counties, regions, states, etc.). In addition, the area may be determined based at least in part on user preferences, such as when a user specifies use of a preferred radius based on the user's ability and/or desire to walk greater or lesser distances.

In step 903, the routine identifies a plurality of categories of geographic-related entities. The plurality of categories may include categories that are related to, or are typically of interest to, users wishing to obtain an assessment of a particular characteristic of the indicated location (e.g., walkability, bikeability, etc.). The particular categories used may be determined in various ways, such as by conducting user surveys, based on user feedback, based on expressed user preferences, etc. Accordingly, in some embodiments, the categories used may be fixed and predetermined, whereas in other embodiments, the categories may be dynamically identified, based on information about a particular user, specified by a user via a user interface, etc. The categories used may be obtained, for example, from the LAPS data repository 816 and/or indications received as part of an initial request (e.g., from a Web browser operated by a user).

In step 904, the routine invokes a DetermineScore routine to obtain an assessment score for the indicated location, the determined area, and the identified categories. An example DetermineScore routine is described with reference to FIG. 10, below.

In step 905, the routine provides a walkability (or other) assessment based at least in part on the determined score. For example, a representation (e.g., an HTML file) may be generated that includes an indication of the score, a graphical scale, and a map, such as was described with reference to FIG. 1.

In step 906, the routine determines whether to continue, and, if so continues to step 901 to await further requests, else ends. The routine may determine not to continue under various circumstances, such as by receiving a shutdown instruction (e.g., a request, signal, etc.).

Figure 10:
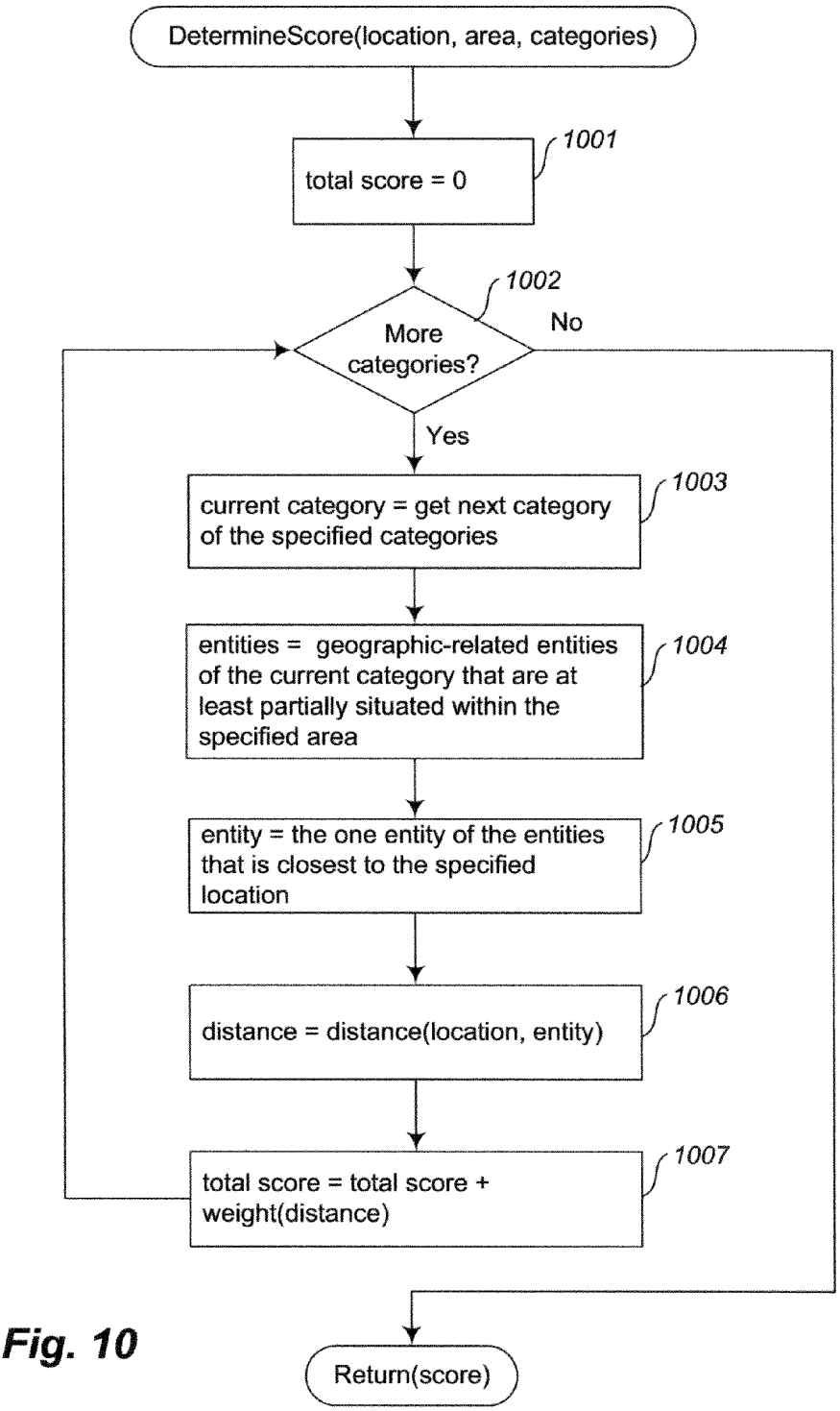
FIG. 10 is an example flow diagram of an example score determination routine provided by an example embodiment of a Location Assessment Provider System.

FIG. 10 is an example flow diagram of an example score determination routine provided by an example embodiment of a Location Assessment Provider System. The illustrated routine may be provided by, for example, execution of the assessment engine 812 described with reference to FIG. 8. The illustrated routine determines and provides an assessment score based on designations of a location, an area, and a plurality of categories of geographic-related entities, such as may be received from the assessment generator routine (e.g., via parameter passing, message passing, etc.) described with reference to FIG. 9, above.

In step 1001, the routine initializes a total score variable. In steps 1002-1007, the routine performs a loop in which it processes each of the designated categories of geographic-related entities in order to determine a candidate geographic-related entity of each category and to accumulate the total score based on the determined geographic-related entities. More specifically, in step 1002, the routine determines whether there are more categories to process, and if so proceeds to step 1003, else returns the accumulated total score.

In step 1003, the routine assigns a current category variable to be the next category of the designated categories, for use by one or more of the following steps. In step 1004, the routine assigns an entities variable to be one or more geographic-related entities of the current category that are at least partially situated within the designated area. Determining the appropriate geographic-related entities may include may include finding all of the geographic-related entities of the current category that have locations that are within, that overlap, or that adjoin the designated area. For example, if the current category is "Restaurants," the routine may find six restaurants having street addresses located within the designated area. In one embodiment, the geographic-related entities are at least initially discovered using standard search queries to available (third party) search engines. For example, a text-based query, such as "restaurants 111 Elm Street, Anytown," provided to a search engine, may be used to obtain a list of restaurants near 111 Elm Street in the city of Anytown. Depending on the implementation, the obtained list may be ordered based on proximity to the specified address and may include additional information about each of the restaurants (e.g., a street address, telephone number, menu information, etc.). Depending upon the particular location assessment, other methods for discovering the geographic-related features may be employed.

In step 1005, the routine assigns an entity variable to be the one entity of the entities that is closest to the designated location. For example, if the entities determined in step 1004, above, includes six restaurants, the routine will select the restaurant that is the closest to the indicated location. Various distance measures may be used, including straight line distance, Manhattan distance (i.e., the distance if a grid like path were followed between two points, as may be obtained by summing the horizontal and vertical distances traveled on a grid between two points), map distance (i.e., the distance, possibly optimal based on a particular cost function, if actual routes on a map were followed between two points), driving distance (i.e., the distance that would be traveled by a car or other vehicle that may travel only on roads), walking distance (i.e., the distance that would be traveled by a pedestrian using some combination of roads and walkways), etc. The distance measure may also take into account other costs associated with travel, such as hills, speed limits, route type (e.g., city street or freeway), current, average, and/or predicted conditions (e.g., weather, traffic, etc.), etc.

In step 1006, the routine assigns a distance variable to be the distance between the entity and the specified location. In some embodiments, this distance will have already been calculated as part of step 1005, above, during the course of identifying the closest geographic-related entity to the location, and accordingly may be utilized here directly without recalculation. In other embodiments, a distance according to a desired unit may be calculated.

In step 1007, the routine assigns the score variable to be the sum of the current score plus the result of a weight function applied to the determined distance between the geographic-related entity and the location. Various types of weight functions may be utilized, as illustrated in the Table 1, below. It will be appreciated that other types of functions may be used in other embodiments. After step 1007, the routine returns to the beginning of the loop in step 1002.

TABLE 1

| Function class | Example Function |
|---|---|
| Linear | weight(distance) = a − (b × distance), where a and b are constants |
| Polynomial | weight(distance) = a − b × distance$^c$, where a, b, and c are constants |
| Exponential | weight(distance) = a × e$^{(-b \times distance)}$, where a and b are constants, and e is Euler's number |
| Step | weight(distance) = 10, if 0 <= distance < 0.25 weight(distance) = 8, if 0.25 <= distance < 0.5 weight(distance) = 4, if 0.5 <= distance < .75 weight(distance) = 2, if 0.75 <= distance < 1.0 weight(distance) = 0, if 1.0 <= distance |

After the completion of the loop of steps 1002-1007, the routine returns the accumulated score, such as to the assessment generator routine described with reference to FIG. 9, above. In addition, prior to returning the accumulated score, the routine may optionally scale or normalize the accumulated score, such that the returned score is between two constant values, such as zero and one, zero and 100, etc.

Although the routines of FIGS. 9 and 10 perform various area-based operations, such as determining an area and selecting only entities within the area, other embodiments may not consider or process areas in such a manner. For example, in step 1004 of FIG. 10, the routine obtains a collection of geographic-related entities of a particular category that are situated within the specified area. In other embodiments, the routine may simply obtain (e.g., from a search engine) a collection of all entities of a particular category that are near the specified location, and order the collection based on distance from the specified location. In such a case, the routine may simply take the first (if one exists) entity from the ordered collection, and need not perform the operation of step 1005, where it searches for the entity having the minimum distance from the specified location. Such an approach may result in the consideration of entities that are outside of an area of interest (e.g., a one mile radius from the specified location), but the impact of such entities may be implicitly controlled (e.g., totally eliminated or made negligible) via the choice of the weighting function. For example, a weighting function whose output approaches or equals zero for any distance that is greater than one mile will minimize or eliminate the impact of entities that lie outside of a one mile radius area of interest. Other variations, for example, those that account for partially included entities based upon user preference may also be accommodated.

Figure 11:
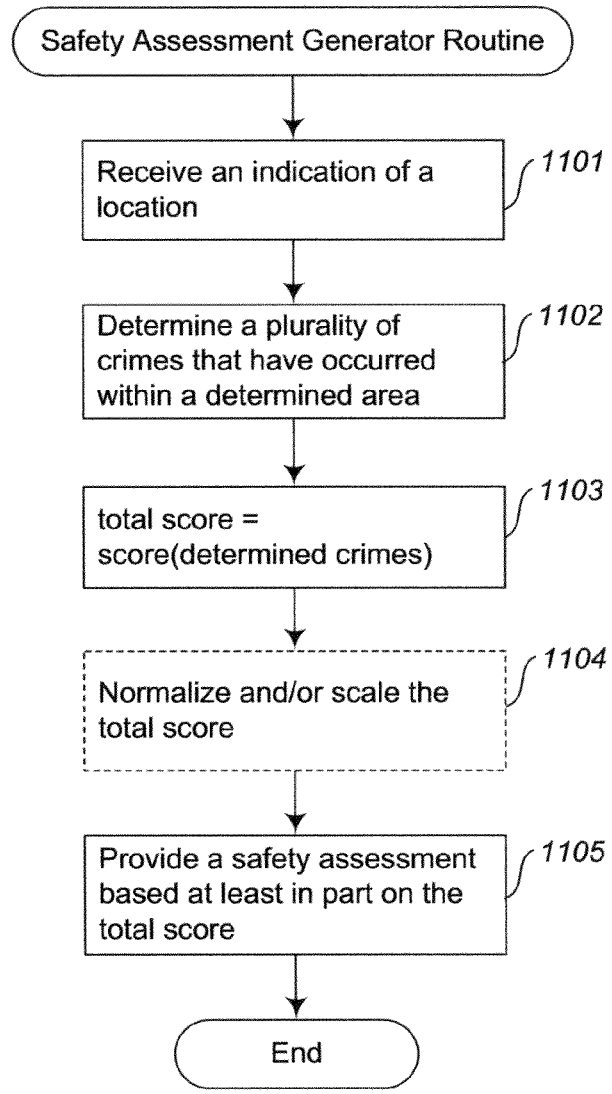
FIG. 11 is an example flow diagram of an example safety assessment generator routine provided by an example embodiment of a Location Assessment Provider System.

FIG. 11 is an example flow diagram of an example safety assessment generator routine provided by an example embodiment of a Location Assessment Provider System. The illustrated routine may be provided by, for example, execution of the assessment engine 812 described with reference to FIG. 8. The illustrated routine generates and provides safety assessments in response to received indications of locations, such as may be received from Web browsers executing on client systems 860, the user interaction engine 814, and/or the LAPS API 815, as described with reference to FIG. 8.

The routine begins at step 1101 where it receives an indication of a location. The location may be indicated in various ways, such as by a street address, zip code, city name, coordinates (e.g., latitude and longitude), etc.

In step 1102, the routine determines a plurality of crimes that have occurred within a determined area. As discussed above, areas may be determined in various ways. In one example, the area is a circle having a one-mile radius surrounding the indicated location. The crimes that have occurred within the determined area may be determined with reference to various data sources, such as statistics provided by law enforcement agencies for various jurisdictions (e.g., Federal, state, county, city, etc.). In some embodiments, the routine may filter or otherwise exclude crimes that have occurred outside of a particular time period. For example, the routine may only consider crimes that have occurred in the last year. Such data may be made available through third parties in near real-time, or stored, for example, in the LAPS data repository of FIG. 8.

In step 1103, the routine determines a total score that is the result of a scoring function applied to the determined crimes. In this example embodiment, the scoring function weights each crime according to the distance of the crime from the indicated location, as follows:

$$score = \sum_{i=1}^{n} weight(distance(location, crime_i))$$

In the above equation, distance is a function that calculates the straight line distance between the location and a given crime, and weight is a function such one of those discussed with reference to FIG. 10, above. In this example, a step function is used that assigns four points to each crime occurring within 0.25 miles of the location, 1.35 points to each crime occurring within 0.5 miles of the location, 0.8 points to each crime occurring within 0.75 miles of the location, and 0.58 points to each crime occurring within 1.0 miles of the location. Such a weight function places greater emphasis on crimes occurring closer to the location. In addition, the illustrated weighting function, for geographically uniform distributions of crimes, results in scores that are equal to the total number of crimes in the area of the distribution. Other embodiments may of course utilize other weighting schemes/functions. For example, other embodiments may incorporate the seriousness and/or type of crime (e.g., felony vs. misdemeanor, violent crime vs. property crime, etc.).

For illustrative purposes, Table 2, below, shows two example crime distributions for 260 crimes occurring within the determined area.

TABLE 2

| Distance | Distribution A | Distribution B |
| --- | --- | --- |
| 0 <= distance < 0.25 | 16 | 30 |
| 0.25 <= distance < 0.5 | 48 | 90 |
| 0.5 <= distance < 0.75 | 82 | 80 |
| 0.75 <= distance <= 1.0 | 114 | 60 |
| Weighted Total: | 261 | 340 |

Distribution A represents a geographically uniform distribution of 260 crimes. In a geographically uniform distribution, the total number of crimes will increase as distance from the location increases, because at such distances, correspondingly larger areas are considered. This is illustrated by, for example, the fact that there are three times as many crimes between 0.25 and 0.5 miles as there are between 0.0 and 0.25 miles, because the area between 0.25 and 0.5 miles is three times as large as the area between 0.0 and 0.25 miles. The weighted total for Distribution A is 261, as expressed by 16*4.0+48*1.35+82*0.8+114*0.58≈261.

Distribution B represents a geographically non-uniform distribution of 260 crimes in which relatively more crimes (as compared to the uniform Distribution A) occur closer to the location (e.g., within 0.25 miles of the location). The weighted total for Distribution B is 340, as expressed by 30*4.0+90*1.35+80*0.8+60*0.58≈340. The higher score resulting from Distribution B (than that of Distribution A) reflects the emphasis given by the described scoring function to crimes that occur more closely to the indicated location.

In step 1104, the routine optionally normalizes and/or scales the total score determined in step 1103. In one embodiment, a crime score may be expressed as a percentage of a baseline crime index. For example, a baseline index of the number of crimes per unit area may be calculated by dividing the national number of crimes per 100,000 persons (e.g., obtained from the Federal Bureau of Investigation) by 100,000, and then multiplying the resulting quantity by the number of persons living in the indicated area (e.g., obtained by reference to census data, estimated based on city population divided by city square miles, etc.). The crime score may then be expressed as a percentage of the determined score to the baseline index. For example, if the baseline index is 260, then the percentage of Distribution A is 100% (i.e., 260/260*100), while the percentage of Distribution B is 131% (i.e., 340/260*100). Note that in the illustrated embodiment, the weighting function is configured so that a uniform distribution of crimes, such as Distribution A, will result in a score that is equal, or approximately equal, to a baseline crime index, such that additional scaling/normalizing is not necessary when determining a percentage as described above. In other embodiments, such as where a different weighting function is utilized, the determined score may be normalized to a baseline index prior to determining a percentage.

In addition, such a percentage of baseline index may be converted to a scale of 0 to 100 that expresses a level of safety, such that a higher number of points reflects a generally safer location (fewer crimes and/or crimes occurring further away from the location). For example, a distribution having no crimes (0% of the baseline index) may be expressed as 100 points; a distribution that scores 100% of the baseline index (e.g., Distribution A, above) may be expressed as 50 points; and a distribution that scores equal to or greater than 1000% of the baseline index may be assigned zero points. Various types of functions may be utilized for such a conversion, including a step function, an exponential function, etc. In some embodiments, the determined score of step 1104 may be directly converted to a point scale, without first determining a percentage of baseline index.

In step 1105, the routine provides a safety assessment based at least in part on the determined score. For example, a representation (e.g., an HTML file) may be generated that includes an indication of the score, a graphical scale, and a map, such as was described with reference to FIG. 1. The provided safety assessment may also include symbols that indicate the actual location and/or type of crimes, if such data is available, may be color-coded, or use another indication of crimes.

Figure 12:
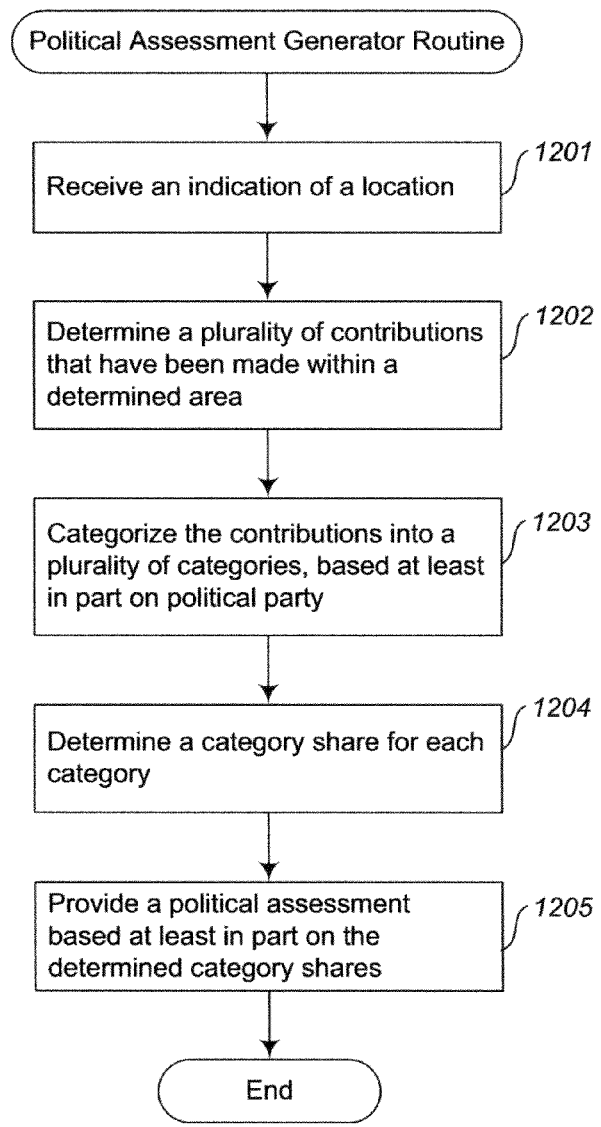
FIG. 12 is an example flow diagram of an example political assessment generator routine provided by an example embodiment of a Location Assessment Provider System.

FIG. 12 is an example flow diagram of an example political assessment generator routine provided by an example embodiment of a Location Assessment Provider System. The illustrated routine may be provided by, for example, execution of the assessment engine 812 described with reference to FIG. 8. The illustrated routine generates and provides political assessments in response to received indications of locations, such as may be received from Web browsers executing on client systems 860, the user interaction engine 814, and/or the LAPS API 815, as described with reference to FIG. 8.

The routine begins at step 1201 where it receives an indication of a location. The location may be indicated in various ways, such as by a street address, zip code, city name, coordinates (e.g., latitude and longitude), etc.

In step 1202, the routine determines a plurality of political contributions that have been made within a determined area. In this example, the determined area is a one-mile square surrounding the indicated location. The contributions that have been made within the determined area may be determined with reference to one or more data sources, such as data provided by the Federal Elections Commission, or various state or local electoral agencies. In some embodiments, the routine may aggregate data from multiple data sources, such as to combine two or more federal, state, and/or local data sources. In addition, the routine may utilize data related to contributions made within a particular time period (e.g., the last four years) and/or election cycle (e.g., a presidential primary campaign). Such data may be stored remotely or locally, for example in the data sources 855 or the LAPS data repository 816 of FIG. 8.

In step 1203, the routine categorizes the contributions into a plurality of categories, based at least in part on political party (e.g., Democratic, Republican, Green, Libertarian, etc.). In some cases, a contribution may have been made directly to a particular political party, and as such may be directly assigned to the corresponding category. In other cases, a contribution may have been made to a candidate or other entity (e.g., political action committee) affiliated with a particular political party, and as such may be assigned to the category corresponding to the affiliated political party. In addition, in some embodiments, contributions to minor political parties (e.g., political parties receiving fewer than a threshold number, percentage, or amount of contributions) may be consolidated into a single, catch-all category (e.g., "Other Parties").

In step 1204, the routine determines a category share for each category. In the illustrated example, the category share for a given category may be determined as follows:

$$share_i = |category_i| / |contributions|$$

In the above equation, $|category_i|$ is the number of contributions in a given category (e.g., the number of contributions to the Democratic Party and/or candidates running for the Democratic Party) and $|contributions|$ is the total number of contributions. Accordingly, $share_i$ represents the fraction of the total number of contributions given to party i.

Figure 13A:
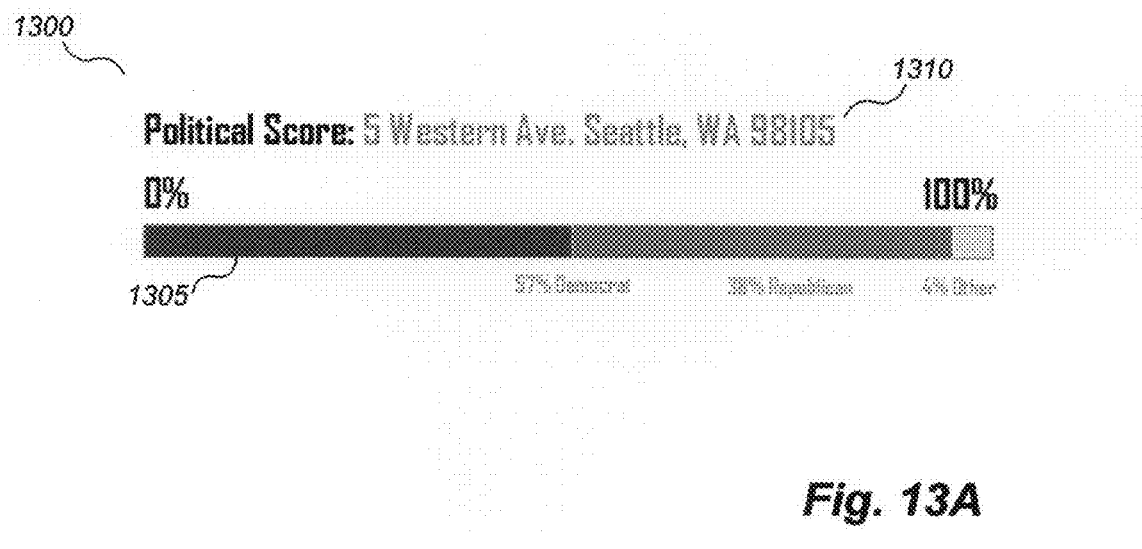
FIGS. 13A-13B illustrate example visual representations of political assessments.
Figure 13B:
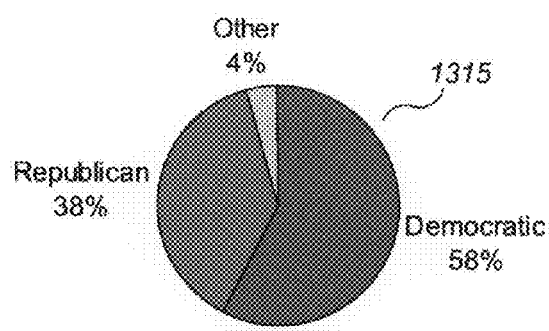

In step 1205, the routine provides a political assessment based at least in part on the determined category shares. In the illustrated embodiment, providing a political assessment includes generating a visual representation (e.g., bar chart, bar chart, histogram, etc.) of the category shares determined in step 1204. Such a visual representation may be interactive, in that it may respond to inputs received from a user, such as by providing additional information about contributions made to a selected party. FIGS. 13A-13B, below, illustrate example visual representations of political assessments.

Although the categorization of contributions has been described above as being based on political party affiliation, other embodiments may base the categorization of contributions on other characteristics, such as positions taken on particular issues by candidates and/or parties. For example, contributions may be categorized based on stances taken by politicians with respect to political issues, such as taxation, military spending, environmental protection, abortion rights, gun control, etc. Such stances may be determined with respect to various data sources, such as voting records, polling data, etc.

In addition, although the determination of political assessments has been described above as being based on the number of contributions made to various parties, other embodiments may in addition, or instead, weight the contributions based on one or more other factors. For example, contributions may be weighted by size (e.g., amount of money given) and/or location (e.g., distance from the indicated location).

FIGS. 13A-13B illustrate example visual representations of political assessments. In particular, FIG. 13A depicts a political assessment 1300 comprising a bar chart 1305 and an indication of a location 1310 (e.g., a street address). The bar chart 1305 reflects that in an area surrounding the indicated location (e.g., as determined by a one mile radius around the street address 1310), 57% of the contributions were made to the Democratic Party, 38% of the contributions were made to the Republican Party, and 4% were made to other political parties. FIG. 13B depicts a pie chart 1315 that may be used as an alternative to the bar chart 1310 described with reference to FIG. 13A.

Figure 14A:
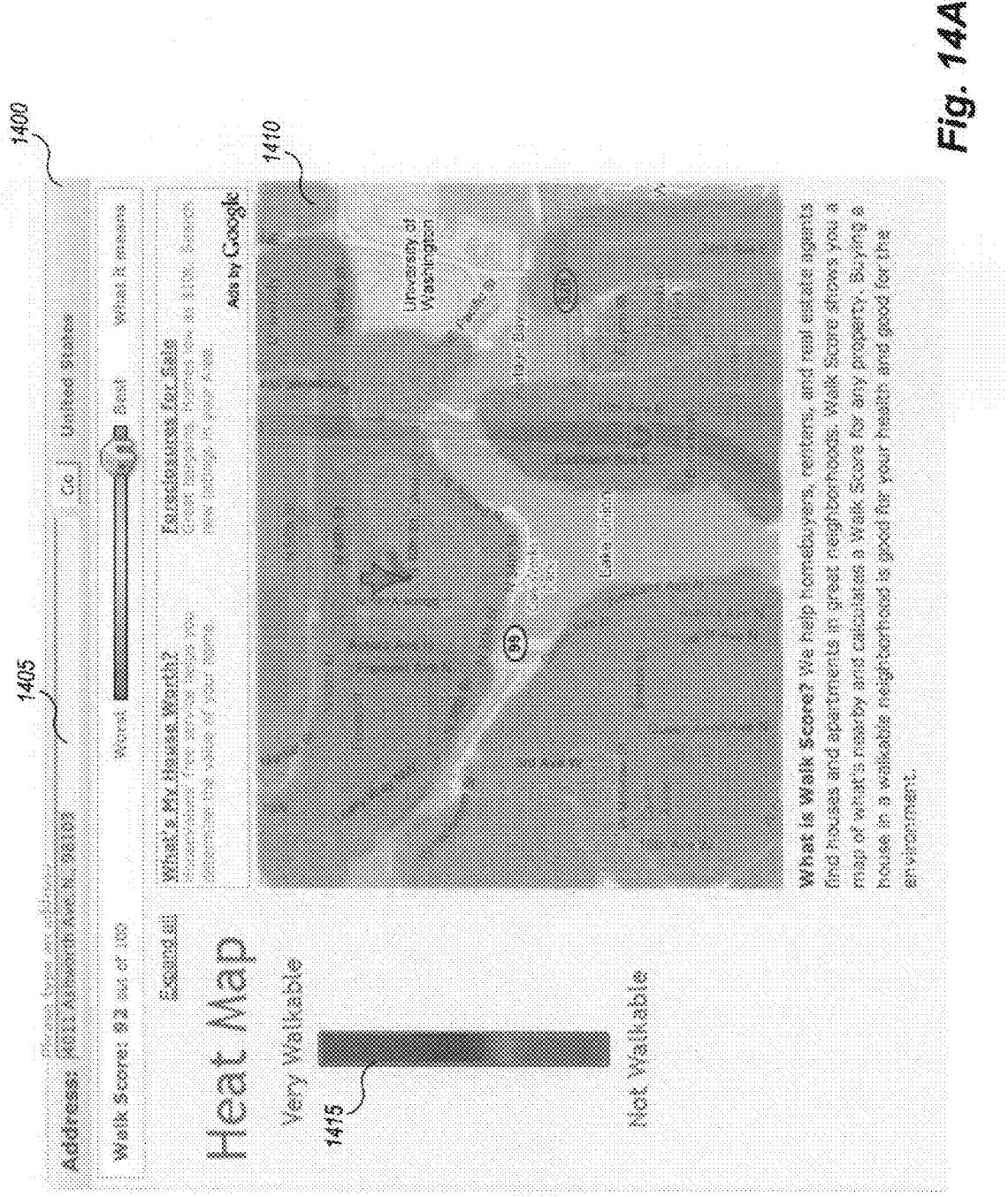
FIGS. 14A-14B illustrate example aggregate visual representations of multiple location assessments.
Figure 14B:
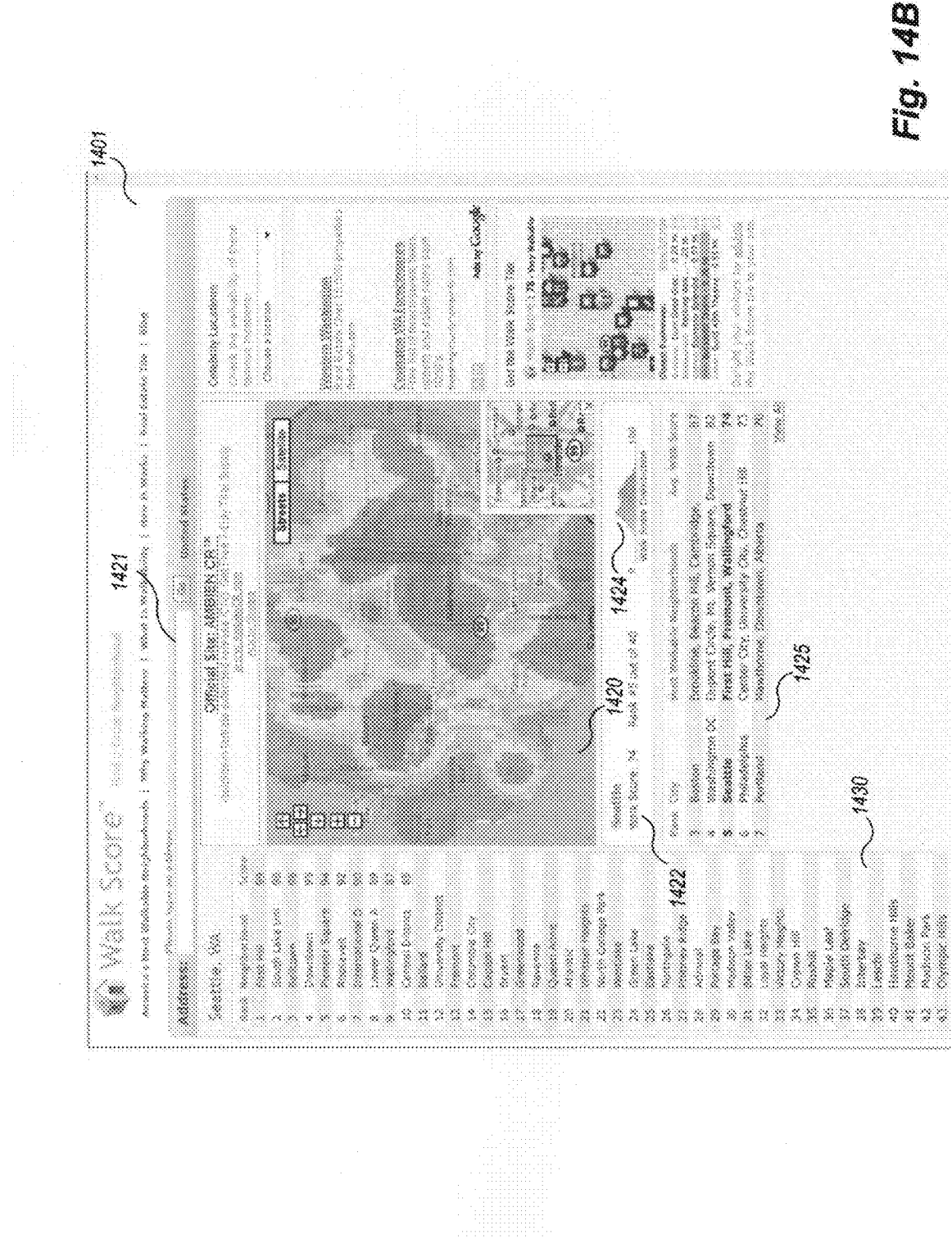

FIGS. 14A and 14B illustrate example aggregate visual representations of multiple location assessments. In particular, FIG. 14A illustrates a location assessment screen 1400 that provides a user with a view of one or more aggregated location assessments (e.g., one or more walkability assessments, one or more safety assessments, one or more political assessments, etc.) as a heat map 1410. The location assessment screen 1400 includes a user input control 1405 for specifying a location, the heat map 1410, and a key/legend 1415.

In the illustrated example, a user may specify, via the user input control 1405, a location as a street address, city, and/or zip code. In response, the LAPS may generate and provide the heat map 1410 and a legend 1415 for interpreting the heat map. Optionally, the representation may present an indicator (not shown) of a specific measure associated with one or more of the multiple location assessments that are in closest proximity to the specified location; for example, a designated score reflecting a location assessment of a 1 mile radius area surrounding the specified location. The heat map 1410 may be generated by automatically performing location assessments on multiple locations around the specified location in order to determine, for example, a score (e.g., a walk score) for each of the multiple locations. The multiple locations around the specified location may be determined in various ways, such as by determining a latitude/longitude grid around the specified location, by selecting a number of the nearest city blocks around the specified location (e.g., by street intersection), etc. Each location may then be associated with a color that corresponds the determined score for that location, such as red for scores between 100 and 90, pink for scores between 90 and 80, violet for scores between 80 and 65, blue for scores between 65 and 35, aqua for scores between 35 and 20, and green for scores between 20 and 0. Other color coding schemes are contemplated, as is the use of a grey scale. Then, for each location, its associated color may be plotted on the map 1410 in order to provide a user with an aggregated view of location assessments for various locations in the vicinity of the specified location. In addition, patterns or other markings may be used instead of color or to supplement the color coding. Other combinations are possible.

FIG. 14B provides another use for one or more aggregated location assessments (e.g., one or more walkability assessments, one or more safety assessments, one or more political assessments, etc.) as a heat map 1420. The location assessment screen 1401 includes a user input control 1421 for specifying a location, the heat map 1420, and multiple key/legends 1422, 1424, 1425, and 1430. In this example, a walkability assessment is computed for each city and each neighborhood within each city (e.g., as described with reference to FIGS. 15 and 16 or as determined using other techniques). The cities are ranked, and then the "walk scores" of the various neighborhoods within the city that encompasses the currently indicated location (the location entered in input control 1421) are shown in heat map 1420. The key/legend 1425 indicates the rank of other cities that surround the displayed city and their respective average walkability scores. In the particular example shown, a walkability score distribution key/legend 1424 is displayed for the displayed city (or city area) shown in the heat map 1420. In addition, a ranked listing of the neighborhoods in the displayed city is also displayed as key/legend 1430. Also, other embodiments may choose to present some subset of these interfaces or different interfaces, choose a different number of surrounding ranked cities, other combinations, etc.

Various other embodiments and/or combinations of the above-described techniques are contemplated. For example, in one embodiment, a generated location assessment may include score without any other information about a given location, such as a map. In another embodiment, a generated location assessment may include a map or other visual representation without an associated score. Furthermore, some embodiments may not take the distances between a given location and various features into account, and instead consider at least some of the geographic-related features that are located within a particular area. In such cases, the considered geographic-related features may be weighted on some other basis, such as user preferences (e.g., for particular categories), reviews/ratings (e.g., restaurant reviews, school test scores, etc.), social data/statistics, economic statistics/data, etc.

Figure 15:
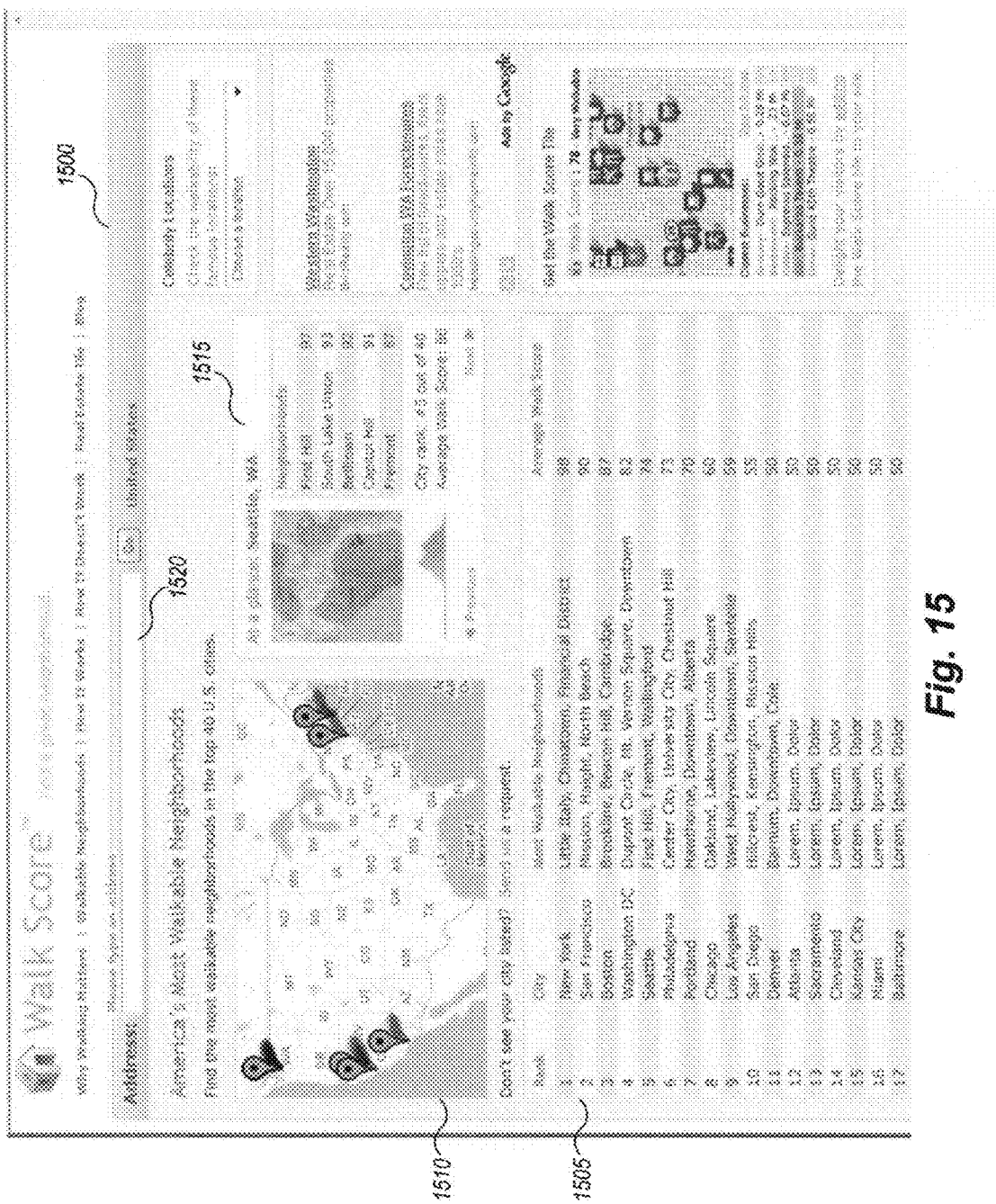
FIG. 15 illustrates an example visual representation of a composite location assessments for multiple areas.

FIG. 15 illustrates an example visual representation of a composite location assessments for multiple areas. In the example illustrated, the location assessment screen 1500 includes a user input control 1520 for entering a location (e.g., an address, city, neighborhood, or other location indication); a context map 1510 that allows a user to see where the relevant area (e.g., in this case a selected city) appears in a larger context (e.g., in this case a country); an area map 1515 (e.g., in this case a map showing neighborhoods in the selected city) with user selectable controls for showing the previous or next city; and an ordered list of cities ranked by average walk score. In one embodiment, the individual city walkability scores are determined based upon finding an aggregate (e.g., average) "walk score" for the city that is determined based upon typically multiple individual area scores (e.g., by neighborhood, square grid, etc.) which are representative scores (e.g., estimates or proxy scores) for that individual area, and weights these scores based upon the population of that individual area. This allows an individual area score to better reflect the area by not unfairly giving a higher score to, for example, an area, with large geographic-related entity but fewer people. In some embodiments, walk scores for multiple cities within each state are determined, and then the city with the best aggregate score chosen to represent each state. The area map 1515 is also shown displaying a heat map similar to that described with reference to FIG. 14B.

Figure 16:
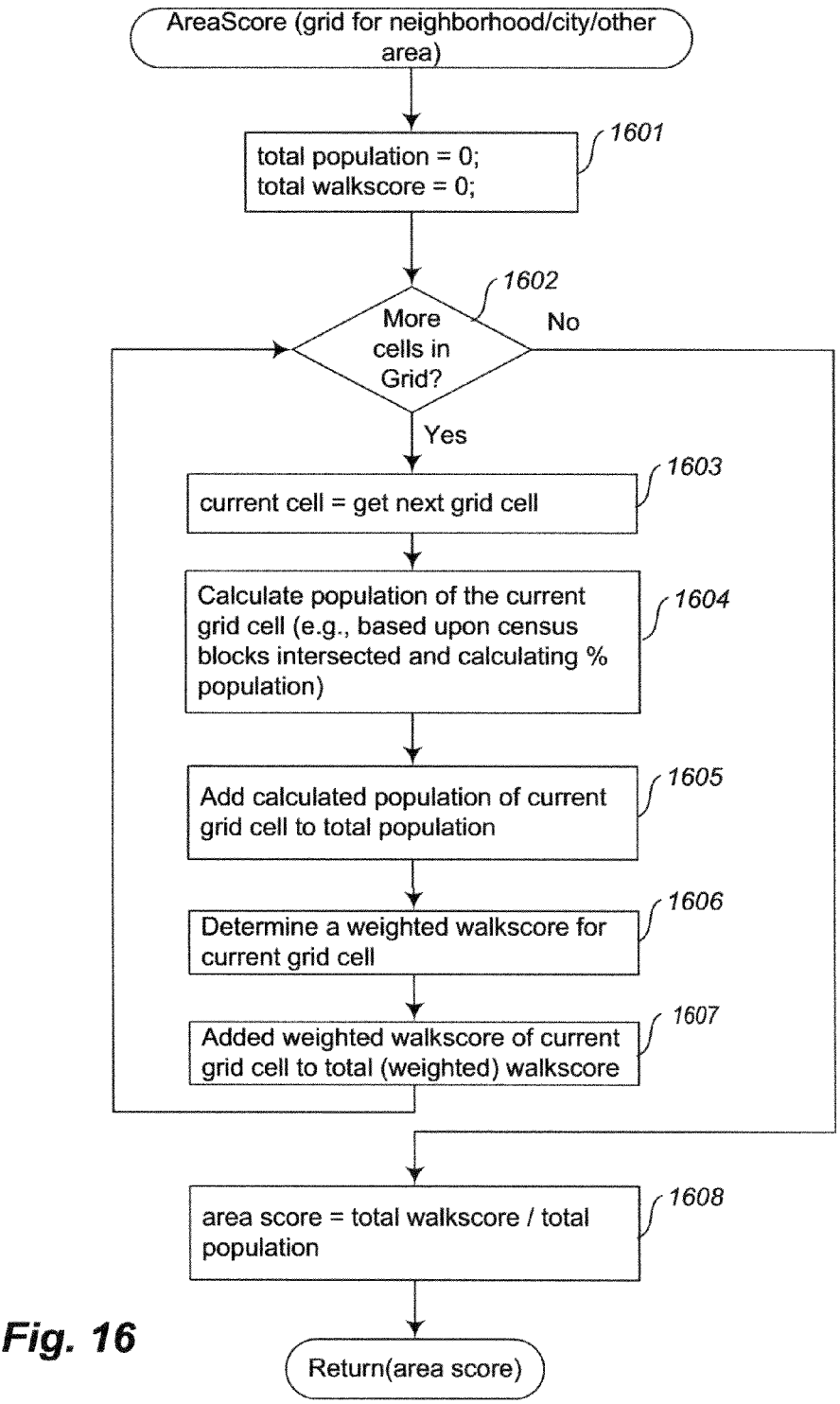
FIG. 16 illustrates an example flow diagram of an example area score determination routine provided by an example embodiment of a Location Assessment Provider System.

FIG. 16 illustrates an example flow diagram of an example area score determination routine provided by an example embodiment of a Location Assessment Provider System. The illustrated routine may be provided by, for example, execution of the assessment engine 812 described with reference to FIG. 8. This routine may be used, for example, to determine an aggregate walkability score for each individual area (e.g., city) that is displayed and ranked in FIG. 15. Other computations for determining an aggregate area score are possible.

The illustrated routine determines and provides a location assessment score for an area based on designations of an area such as a rectangular grid that contains the area, such as may be received from the assessment generator routine (e.g., via parameter passing, message passing, etc.) described with reference to FIG. 9, above. Other embodiments may determine a location grid upon receiving a designated city, neighborhood, etc.

The routine performs a loop for each cell in the designated grid (that represents the area) to determine a representative weighted location assessment (e.g., a score) for the cell, and then determines an overall aggregate location assessment for the area by combining the representative weighted assessments and further weighting them as desired. For example, in the illustrated routine, the representative weighted scores for each cell in a city are summed and then divided by the total population of the city to generate an "average" score for the area. In the embodiment shown, the representative weighted score for each cell is computed by determining a walkability assessment (or other location assessment) for a center point in each cell, and then weighting this by the total population in the cell. Other algorithms and computations for producing an aggregate score (e.g., using statistical measures other than an "average") may be similarly incorporated.

In particular, in step 1601, the routine initializes a total walkscore variable and a total population variable. In steps 1602-1607, the routine performs a loop in which it processes each of the cells in a grid (that represents the area) to find a representative walk score for the cell and to accumulate the total walk score based on aggregating the representative cell scores. More specifically, in step 1602, the routine determines whether there are more cells to process, and if so proceeds to step 1603, otherwise proceeds to step 1608. In step 1603, the routine finds the next current cell in the grid to process. In step 1604, the routine calculates the population of the current grid cell, using any one of a variety of methods including using census track data to determine the population from each census block that 'contributes" population to the grid cell (e.g., by computing the percentage of the census block that falls within the grid cell, multiplying the population of the census block by that percentage to yield a contribution of population to the cell, and adding all of the contributions of populations from the census blocks that contribute population to the cell to determine a total cell population). In step 1605, the routine adds the determined population of the current grid cell to the total accumulated population for the area thus far. In step 1606 the routine determines a representative weighted score for the current grid cell, for example, by determining a location assessment for a location that represents the cell (e.g., the center of the grid cell) and weighting it (e.g., multiplying) by the current grid cell population. Then, in step 1607, the routine adds the representative weighted score of the current grid cell to the total accumulated location assessments for the area computed thus far. In step 1608, after all of the grid cells of the area have been processed, the routine divides the total accumulated location assessments by the total population, and returns an area score.

As described, such an aggregate area score may be used to provide a representative or "average" location assessment for a multitude of cities, so that they may be ranked and presented as shown in the visual presentation of FIG. 15.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/995,823, entitled "SYSTEMS AND METHODS FOR PROVIDING LOCATION ASSESSMENTS," filed Sep. 28, 2007 is incorporated herein by reference, in its entirety.

From the foregoing it will be appreciated that, although specific embodiments have been described herein for purposes of illustration, various modifications may be made without deviating from the spirit and scope of the present disclosure. For example, the methods, systems, and techniques for generating and providing location assessments discussed herein are applicable to other architectures other than a client server architecture or a LAPS implementation. Also, the methods and systems discussed herein are applicable to differing network protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method performed by a computing system for providing location assessments of geographic locations, the computing system having a processor and a memory, the method comprising:
receiving an indication of a location;
determining a location assessment for the indicated location by:
retrieving, by the computing system and from a computer-accessible database, a plurality of geographic-related entities having point locations;
identifying, by the computing system, a plurality of categories of the retrieved geographic-related entities having point locations that are situated near the indicated location;
retrieving, by the computing system and from a computer-accessible database, a plurality of features;
identifying, by the computing system, one or more of the retrieved plurality of features that are situated near the indicated location but do not have point locations, wherein the plurality of features indicate a pedestrian-friendly or bicycle-friendly environment;
calculating, by the computing system, a population density metric, the population density metric reflecting a population of the local area around the indicated location relative to the population of a larger region surrounding the local area;
for each of the plurality of categories,
determining, by the computing system, one or more retrieved geographic-related entities of the category that is situated near the indicated location;
generating, by the computing system for each determined geographic-related entity, a weighted measure based at least in part on a distance between the indicated location and the determined geographic-related entity;
generating, by the computing system for each of the determined plurality of features, a weighted measure that is proportional to the existence of the feature;
aggregating, by the computing system, the generated weighted measures to determine a score that reflects a level of support/quality/attractiveness of pedestrian travel or bicycle travel around the location; and
weighting the score by the calculated population density metric to determine a location assessment; and
providing a visual representation of the determined location assessment.

2. The method of claim 1 wherein the plurality of categories comprise food service establishments, retail establishments, and entertainment establishments.

3. The method of claim 1 wherein the identifying the plurality of categories comprises: selecting as categories at least two of grocery stores, restaurants, coffee shops, bars, movie theaters, schools, parks, libraries, book stores, fitness, drug stores, hardware stores, clothing stores, public transit access points, and music stores.

4. The method of claim 1 wherein the identifying the plurality of categories comprises: receiving an indication of one or more categories preferred by a user; and including the indicated one or more categories in the identified plurality of categories.

5. The method of claim 1 wherein receiving the indication of the location comprises receiving an indication of at least one of a street address, a latitude/longitude coordinate pair, an indication of a neighborhood, a zip code, an indication of a city, or an indication of a geographic region.

6. The method of claim 1 wherein, for each of the plurality of categories, the determining the one or more retrieved geographic-related entities of the category that is situated near the location includes obtaining information about one or more geographic-related entities from a geographic information provider.

7. The method of claim 6 wherein the geographic information provider is a search engine operated by a third party.

8. The method of claim 1 wherein, for each of the plurality of categories, the generating the weighted measure based at least in part on the distance between the location and the determined geographic-related entity includes determining a distance measure between the location and the determined geographic-related entity.

9. The method of claim 8 wherein, for each of the plurality of categories, the determining the distance measure between the location and the determined geographic-related entity includes determining a straight-line distance between the location and the determined geographic related entity.

10. The method of claim 1 wherein, for each of the plurality of categories, the generating the weighted measure based at least in part on the distance between the location and the determined geographic-related entity includes decreasing the weighted measure in proportion to the distance between the location and the determined geographic-related entity.

11. The method of claim 1 wherein the aggregating the generated weighted measures to determine a location assessment includes summing the generated weighted measures.

12. The method of claim 1 wherein the providing the visual representation of the location assessment comprises providing a numerical score reflecting the location assessment.

13. The method of claim 1 wherein the providing the visual representation of the location assessment comprises providing at least one of a textual description reflecting the location assessment, a map of an area around the indicated location, indications of at least some of the selected geographic-entities, and indications of at least some of the plurality of categories.

14. The method of claim 1 wherein each of the plurality of surrounding locations is determined based on a latitude/longitude grid around the indicated location.

15. The method of claim 1 wherein each of the plurality of surrounding locations is determined by selecting a number of the nearest city blocks around the indicated location.

16. A computing system configured to provide location assessments of geographic locations, comprising:
    a memory;
    a module stored on the memory that is configured, when executed, to:
        determine an area that includes an indicated location;
        determine a plurality of surrounding locations that are situated around the indicated location;
        calculate a population density metric, the population density metric reflecting a population of the local area around the indicated location relative to the population of a larger region surrounding the local area;
        retrieve a plurality of geographic-related entities that are stored in a computer-accessible database;
        identify a plurality of categories of the retrieved geographic-related entities;
        for each of the plurality of categories,
            determine one or more geographic-related entities of the category that are at least partially situated within the determined area, each of the geographic-related entities having an associated point location;
            select one of the determined geographic-related entities;
            generate a weighted measure based at least in part on a distance between the indicated location and the point location associated with the selected geographic-related entity;
        retrieve a plurality of features that are stored in a computer-accessible database;
        identify a plurality of the retrieved features that are at least partially situated within the determined area but do not have point locations, wherein the plurality of retrieved features indicate a pedestrian-friendly or bicycle-friendly environment;
        generate, for each of the plurality of retrieved features, a weighted measure based at least in part on the existence of the retrieved feature;
        determine a score based at least in part on the generated weighted measures; and
        weight the score by the calculated population density metric to determine a location assessment; and
        provide a visual representation of the determined location assessment.

17. The computing system of claim 16 wherein the module further comprises software instructions for execution in the memory of the computing system.

18. The computing system of claim 16 wherein the module is a location assessment provider module.

19. The computing system of claim 16 wherein the computing system is communicatively coupled to a geographic information provider, and wherein, for each of at least some of the plurality of categories, the module is further configured, when executed, to request from the geographic information provider information about one or more geographic-related entities of the category that are near the location or that are within the determined area.

20. The computing system of claim 16 wherein the computing system is communicatively coupled to a third-party information provider that is configured, when executed, to provide location specific information to client computing systems, and wherein the module is further configured, when executed, to receive from the third-party information provider a request for a location assessment of the location, and in response, provide the location assessment to the third-party information provider.

21. The computing system of claim 20 wherein the third-party information provider is a real estate information Web site or software application.

22. The computing system of claim 16 wherein the determined area is a circle having a center at the indicated location and a radius of between one and three miles.

23. The computing system of claim 16 wherein the determined area is at least one of a rectangle, a polygon, a zip code region, a neighborhood, or a city.

24. The computing system of claim 16 wherein each of the plurality of surrounding locations is determined based on a latitude/longitude grid around the indicated location.

25. The computing system of claim 16 wherein each of the plurality of surrounding locations is determined by selecting a number of the nearest city blocks around the indicated location.

26. A computer-readable medium whose contents enable a computing system to provide location assessments of geographic locations, by performing a method comprising:
    receiving an indication of a location;
    retrieving a plurality of geographic-related entities from a computer-accessible database;
    identifying a plurality of categories of the retrieved geographic-related entities having point locations that are situated near the indicated location;
    retrieving a plurality of features from a computer-accessible database;
    identifying one or more of the plurality of features that are situated near the indicated location but not having point locations, wherein the plurality of features indicate a pedestrian-friendly or bicycle-friendly environment;
    calculating a population density metric, the population density metric reflecting a population of the local area around the indicated location relative to the population of a larger region surrounding the local area;
    generating a score that reflects a level of attractiveness of pedestrian travel or bicycle travel around the received location, the score based at least in part on:

a weighted measure that is inversely proportional to the distances between the indicated location and each of at least some of the determined geographic-related entities; and a weighted measure that is proportional to the existence of each feature that indicates a pedestrian-friendly or bicycle-friendly environment;

weighting the score by the calculated population density metric to determine a location assessment; and providing a visual representation of the determined location assessment.

27. The computer-readable medium of claim 26 wherein generating the location assessment based at least in part on the weighted measure that is inversely proportional to the distances between the location and each of at least some of the determined geographic-related entities comprises: determining, for each of the distances, a weighted score based on the distance; and generating the weighted measure based on the sum of all of the determined weighted scores.

28. The computer-readable medium of claim 26 wherein the plurality of features include at least one of topographical elements of the area around the indicated location, weather conditions associated with the indicated location, social statistics related to the indicated location, or transportation network elements of the area around the indicated location.

29. The computer-readable medium of claim 26 wherein the plurality of features include at least one abstract geographic-related feature.

30. The computer-readable medium of claim 29 wherein the at least one feature includes at least one of crime statistics, average/predicted weather conditions, average/predicted traffic conditions, average real estate prices, or restaurant reviews/ratings.

31. The computer-readable medium of claim 26 wherein generating the location assessment is further based on a user preference specifying that geographic-related entities of one of the plurality of categories is to be scored more highly than geographic-related entities of another one of the plurality of categories.

32. The computer-readable medium of claim 26 wherein the plurality of features includes one or more criminal events.

33. The computer-readable medium of claim 26 wherein the contents are instructions that when executed cause the computing system to perform the method.

34. The computer-readable medium of claim 26 wherein each of the plurality of surrounding locations is determined by selecting a number of the nearest city blocks around the indicated location.

35. The computer-readable medium of claim 26 wherein each of the plurality of surrounding locations is determined based on a latitude/longitude grid around the indicated location.

* * * * *